(12) United States Patent
Satoh et al.

(10) Patent No.: US 7,540,649 B2
(45) Date of Patent: Jun. 2, 2009

(54) LAMP RETAINING MEMBER, BACKLIGHT DEVICE, LIQUID CRYSTAL DISPLAY APPARATUS, AND FLUORESCENT LAMP RETAINING METHOD

(75) Inventors: Tamotsu Satoh, Iga (JP); Ryoh Hatakeyama, Suzuka (JP); Masaki Shimizu, Kameyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 62 days.

(21) Appl. No.: 11/822,442

(22) Filed: Jul. 5, 2007

(65) Prior Publication Data

US 2008/0007957 A1    Jan. 10, 2008

(30) Foreign Application Priority Data

Jul. 6, 2006  (JP) ............................. 2006-186795
Aug. 8, 2006  (JP) ............................. 2006-215878
May 25, 2007 (JP) ............................. 2007-138642

(51) Int. Cl.
*F21V 7/04* (2006.01)

(52) U.S. Cl. ................... 362/630; 362/220; 362/221; 362/225; 362/260; 362/614; 362/632

(58) Field of Classification Search ......... 362/217–221, 362/225, 249–250, 260, 269, 614, 630–634; 349/58, 70

See application file for complete search history.

(56) References Cited

U.S. PATENT DOCUMENTS 6,962,429 B2 *   11/2005   Yamamoto .................. 362/614

FOREIGN PATENT DOCUMENTS

JP    2005-268028    9/2005

* cited by examiner

*Primary Examiner*—Sandra L O'Shea
*Assistant Examiner*—Jason Moon Han
(74) *Attorney, Agent, or Firm*—Birch, Stewart, Kolasch & Birch, LLP

(57) ABSTRACT

The fluorescent lamp retaining member retains two lamp units each including two fluorescent lamps that have electrodes at both ends thereof, a bundling member that bundles a wire from each of electrodes at one end of the two fluorescent lamps, and a conductive member that connects electrodes at the other end of the two fluorescent lamps through a conductive path. The fluorescent lamp retaining member holds the vicinity of the central of each of the fluorescent lamps so arranged in parallel as to set the bundling members in the same direction. The fluorescent lamp retaining member allows one retained lamp unit to rotate relative to the other retained lamp unit adjacent thereto, and so retains the lamp units adjacent to each other that the bundling members and conductive members are arranged alternately after one lamp unit has been rotated.

10 Claims, 20 Drawing Sheets

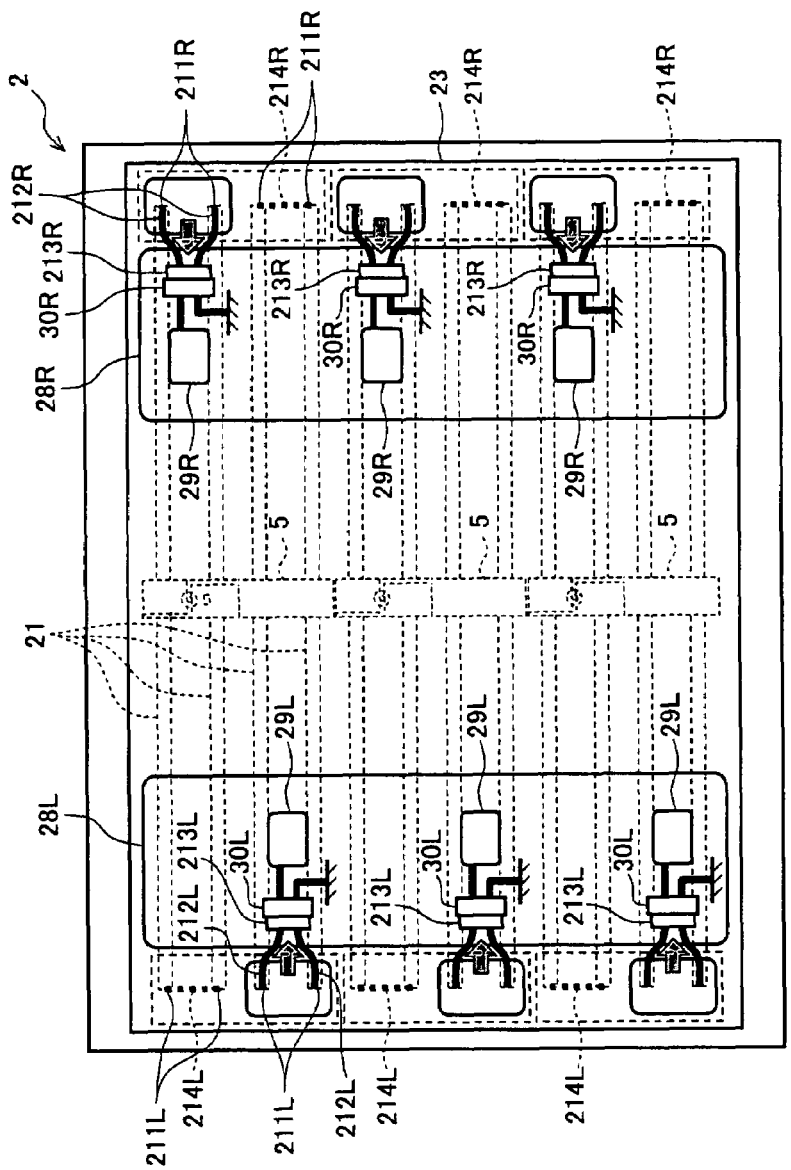
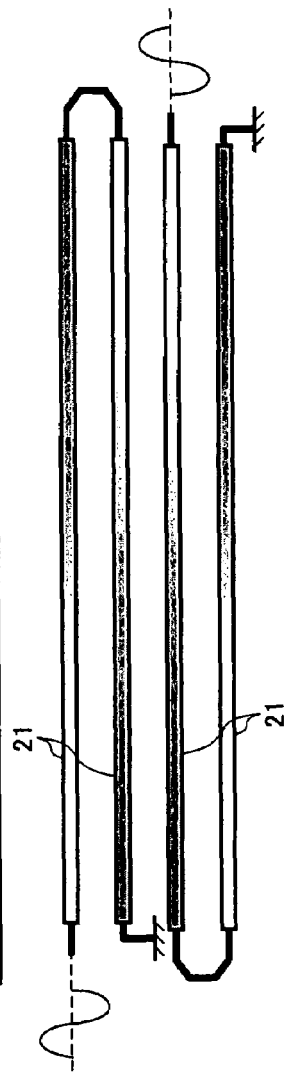
FIG. 6A
FIG. 6B

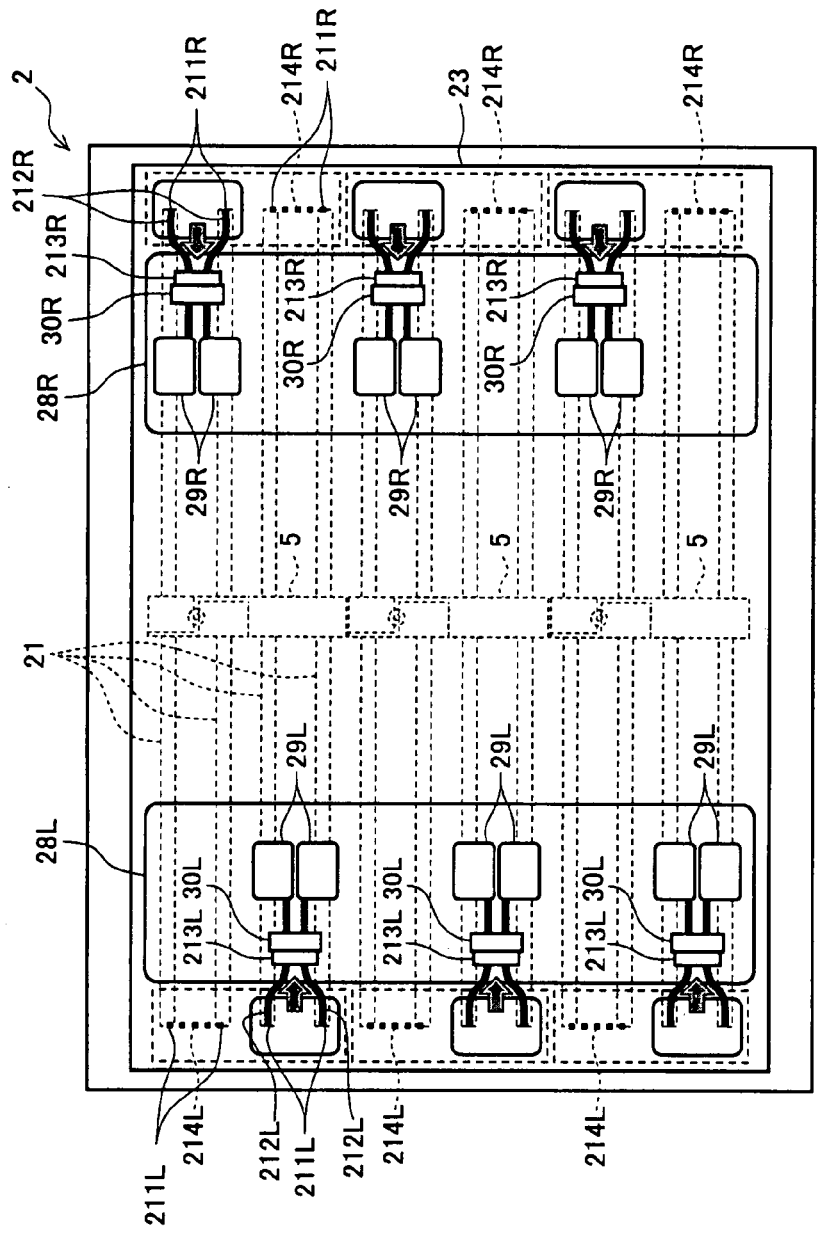
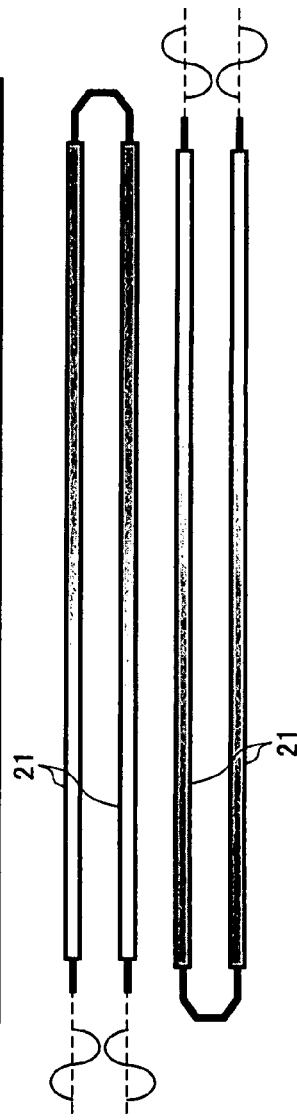
FIG. 7A
FIG. 7B

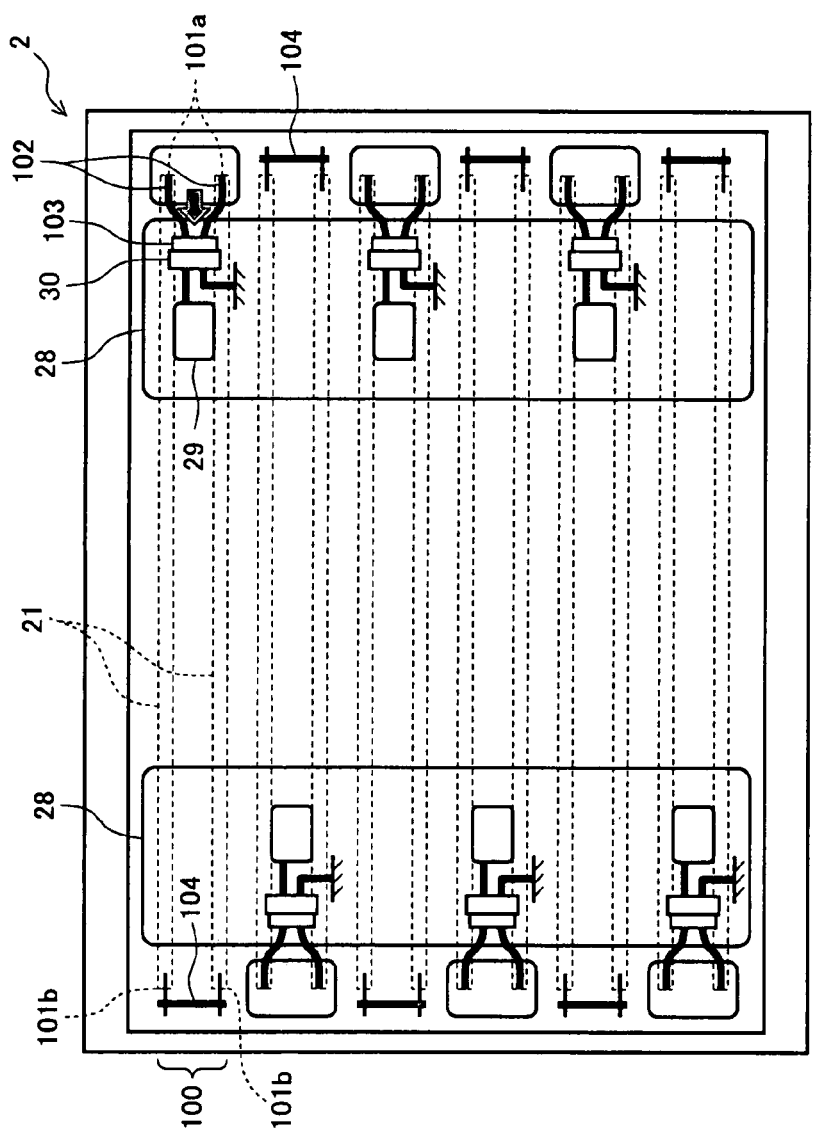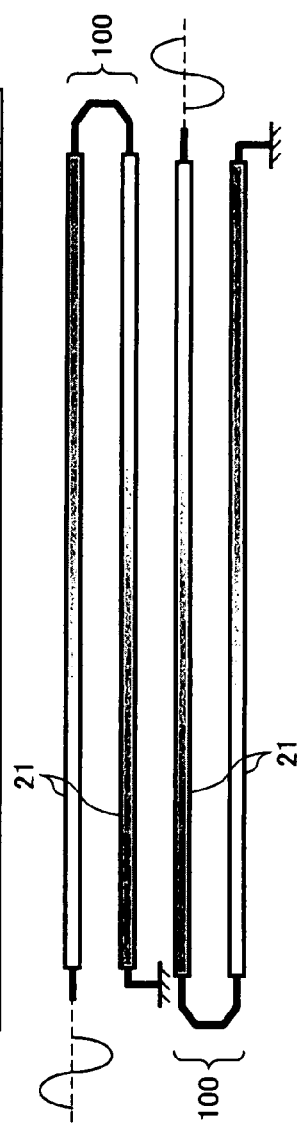
FIG. 9A
FIG. 9B

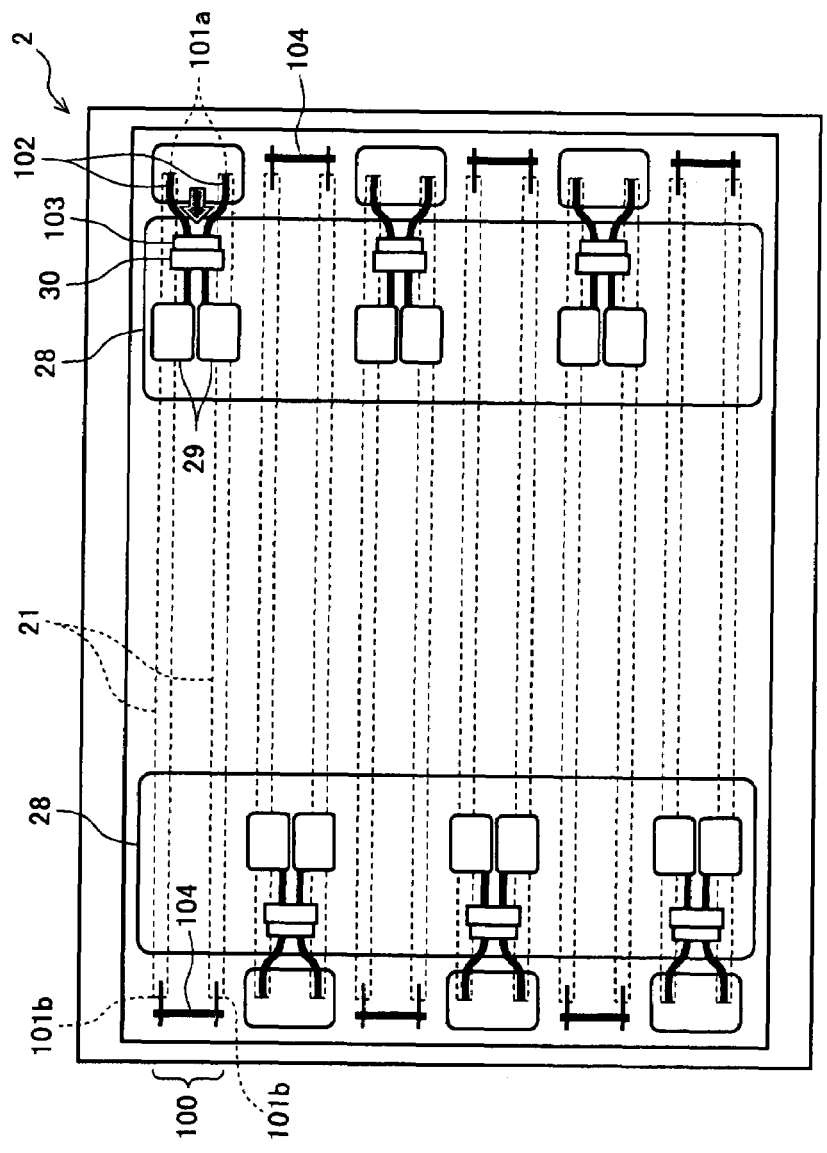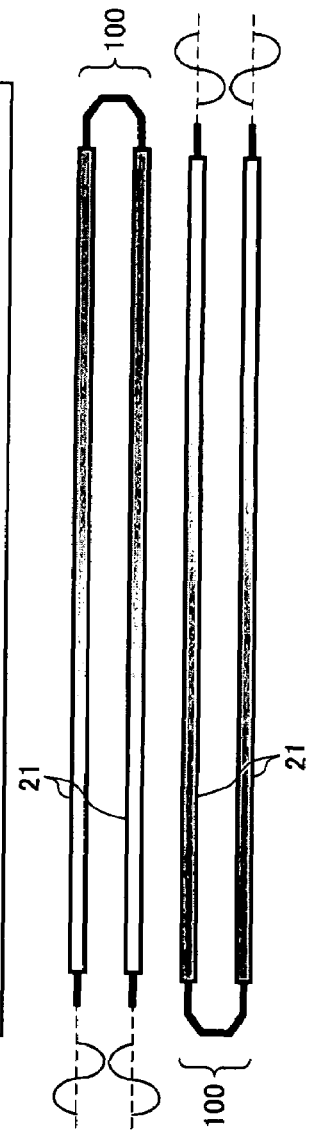
FIG. 10A
FIG. 10B

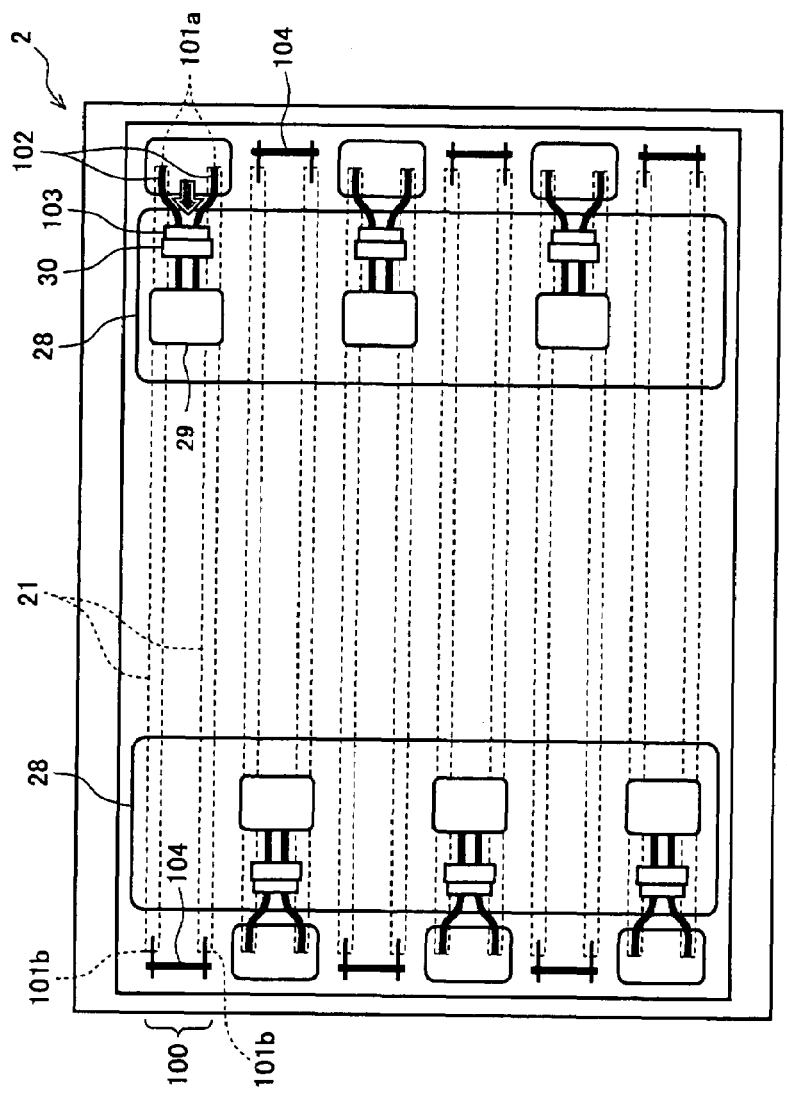
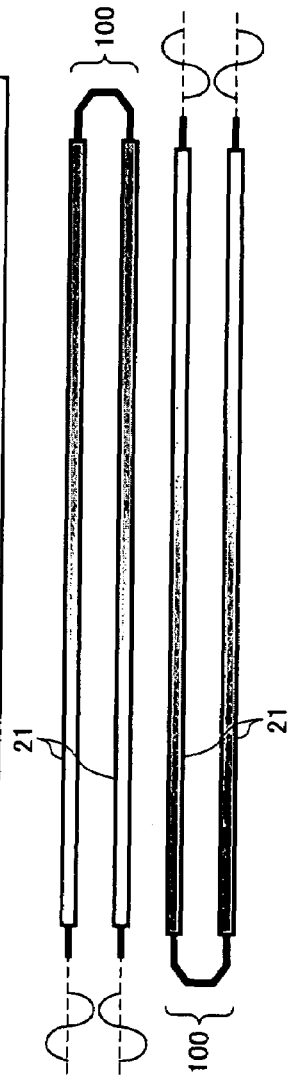
FIG. 11A
FIG. 11B

LAMP RETAINING MEMBER, BACKLIGHT DEVICE, LIQUID CRYSTAL DISPLAY APPARATUS, AND FLUORESCENT LAMP RETAINING METHOD

CROSS-NOTING PARAGRAPH

This Non-provisional application claims priority under 35 U.S.C. §119(a) on Patent Applications No. 2006-186795 filed in JAPAN on Jul. 6, 2006, No. 2006-215878 filed in JAPAN on Aug. 8, 2006 and No. 2007-138642 filed in JAPAN on May 25, 2007, the entire contents of which are hereby incorporated herein by reference.

FIELD OF THE INVENTION

The present invention relates to a lamp retaining member retaining a plurality of lamps driven by an inverter circuit, a backlight device having the lamp retaining member, a liquid crystal display apparatus using the backlight device, and a lamp retaining method.

BACKGROUND OF THE INVENTION

In recent years, a demand for a larger backlight has been increasing as the screen of a liquid crystal TV set, etc., becomes bigger and bigger. To meet such a demand for a size increase plus demands for energy saving, lower prices, etc., a bent tube fluorescent lamp of a U shape or rotated U shape is fabricated by bending an elongated straight tube fluorescent lamp at its approximate center to replace a conventional straight tube fluorescent lamp with the bent tube fluorescent lamp, and a backlight incorporating such a bent tube fluorescent lamp as a light source is developed.

A backlight using the above bent tube fluorescent lamp achieves a relatively uniform temperature distribution when operates for a screen with a diagonal smaller than 17 inches, in which case a minor temperature difference or luminance difference in the direction of the tube axis arises but hardly poses a problem. As the screen size becomes further greater, however, lamp electrodes, which are a main heat source, come to have a higher temperature. In addition, voltage applied to lamps gets higher due to an increase in the length of the lamps, which produces a floating capacitance between a lamp and a unit, creating a condition where a leak current is generated easily near a high-voltage portion. Besides, a lamp power increase leads to an inverter power increase, which causes an inverter disposed on the back side of the lamp electrodes to generate a greater amount of heat. As a result, a temperature difference in the direction of the lamp tube axis grows greater.

The generation of an above leak current means that a lamp is kept turned on with a current value to the sum of a rated current and the leak current near the high-voltage portion in the direction of tube axis. This is the cause of a luminance difference arising in the direction of lamp tube axis. Hence a backlight having a greater size intensifies a tendency of an increase in a temperature difference and luminance difference in the direction of lamp tube axis, which causes the irregularities of luminance of the backlight.

In this manner, in a case of a backlight using bent tube fluorescent lamps (U shape, rotated U shape, etc.), the length of the fluorescent lamp increases with an increase in the size of the backlight, which leads to a higher applied voltage to the lamps. This results in the generation of a floating capacitance between a fluorescent lamp and an enclosure, etc., creating a condition where a leak current is generated easily near a high-voltage portion. As a result, a luminance difference arises in the direction of tube axis of the fluorescent lamps, becoming the cause of the irregularities of luminance of the backlight.

Besides, an increase in voltage applied to the fluorescent lamps leads to an increase in power supplied to an inverter driving the lamps, thus leading to an increase in heating value generated from the inverter. The inverter is disposed usually on the back side of the electrodes of the fluorescent lamps, so that a temperature difference in the direction of tube axis of the fluorescent lamps arises easily. Such a temperature difference too becomes the cause of a luminance difference in the direction of tube axis of the fluorescent lamps.

A solution to a problem of the irregularities of luminance of the backlight has been suggested. For example, Japanese Laid-Open Patent Publication No. 2005-268028 discloses a backlight that is capable of illuminating with uniform luminance even when illuminating a large-screen liquid crystal display.

According to Japanese Laid-Open Patent Publication No. 2005-268028, the electrode side and bent side of bent tube fluorescent lamps are arranged alternately, and each inverter is disposed right on the back side of a reflective case (enclosure) at the electrode power supply side of each fluorescent lamp, so that a tube wall temperature difference in the direction of the lamp tube axis and of the panel surface is reduced and a luminance difference on the panel surface is also reduced.

According to the invention described in Japanese Laid-Open Patent Publication No. 2005-268028, when a worker tries to arrange U-shaped lamp units in the reflective case, etc., in orderly fashion in mounting the lamp units on the backlight, the worker must put the lamp units in such an arrangement that the second lamp electrodes are located opposite to the first lamp electrodes. This arrangement work often involves work of counting lamp units to be mounted and of shifting the lamp unit from one hand to the other upon mounting the lamp units, especially upon mounting fluorescent lamps for use in the backlight, which fluorescent lamp has a diameter of about two to five millimeters and a length of about several tens of centimeters to several tens of meters. This makes mounting of the lamp units troublesome, and may invite problems of erroneous mounting, lamp breakage, etc.

According to the above backlight disclosed in Japanese Laid-Open Patent Publication No. 2005-268028, the U-shaped fluorescent lamps must be so arranged that the electrode side and the bent side of the fluorescent lamps are set alternately in rows when the fluorescent lamps are housed in the reflective case. This necessitates repeating work of locating the second lamp electrodes opposite to the first lamp electrodes and arranging the next lamp electrodes in the same manner as the first electrodes.

This case involves work of counting fluorescent lamps to be mounted and of shifting the fluorescent lamp from one hand to the other, which makes mounting of the fluorescent lamps troublesome and may invite problems of erroneous mounting and breakage of the fluorescent lamp. Such problems are easy to occur, particularly, in mounting a fluorescent lamp for use in the backlight, which fluorescent lamp has a diameter of about two to five millimeters and a length of about several tens of centimeters to several tens of meters.

The fluorescent lamps to be mounted on the backlight are usually packed in a packaging material, such as a cardboard and are distributed to be supplied to a backlight production process. In this case, the U-shaped fluorescent lamps are arranged horizontally in the packaging material, where the fluorescent lamps are stacked in tiers via buffering materials, etc.

On a production line for the backlight whose size further increases as a screen size further increases, an amount of fluorescent lamps to be used on the production line becomes enormous, which results in an increase in the capacity of a packaging material containing the fluorescent lamps. This leads to problems of an inefficient production process, an increase in a space occupied by the fluorescent lamps around the production line, etc.

SUMMARY OF THE INVENTION

The object of the present invention is to provide a lamp retaining member that prevents erroneous mounting and breakage of a fluorescent lamp upon mounting fluorescent lamps and that reduces or eliminates the irregularities of luminance of a backlight due to a luminance difference arising in the direction of the tube axis of the fluorescent lamps, a backlight device having the lamp retaining member, a liquid crystal display apparatus using the backlight device, and a lamp retaining method.

Another object of the present invention is to provide a lamp retaining member that keeps alternately arranged fluorescent lamps folded in a unit form to remarkably reduce a space occupied by the fluorescent lamps in packaging the fluorescent lamps, eliminate a need of work of checking or reversing the direction of the fluorescent lamps upon mounting the fluorescent lamps, and enable the production of a backlight device with less luminance irregularities in streamlined and highly reliable workability, and to provide the backlight device having the lamp retaining member.

Another object of the present invention is to provide a lamp retaining member retaining a plurality of lamp units each comprising a plurality of lamps having electrodes at both ends thereof, a bundling member bundling a wire from each of electrodes at one end of the plurality of lamps, and a conductive member connecting electrodes at the other end of the plurality of lamps through a conductive path, wherein the lamp retaining member retains the vicinity of a central of each of lamps so arranged in parallel that the bundling members are set in the same direction, and allows the one retained lamp unit to rotate relative to the other retained lamp unit adjacent thereto.

Another object of the present invention is to provide the lamp retaining member, wherein the lamp retaining member retains the lamp units adjacent to each other so that the bundling member and the conductive member are arranged alternately after the one lamp unit has been rotated.

Another object of the present invention is to provide the lamp retaining member, comprising a first retaining member retaining the one lamp unit, a second retaining member retaining the other lamp unit, a rotating shaft erected on the first retaining member; and a protruding portion that houses the rotating shaft so as to allow the rotating shaft to rotate and that is formed integrally with the second retaining member, wherein when the one lamp unit is not rotated, a bottom of the first retaining member is so fitted to a bottom of the second retaining member that both bottoms do not overlap each other, and the first retaining member is coupled to the second retaining member via the rotating shaft, and wherein when the one lamp unit is rotated, the first retaining member is separated away from the second retaining member to render the rotating shaft rotatable state relative to the protruding portion, so that the first retaining member can be rotated 180 degrees around the rotating shaft.

Another object of the present invention is to provide the lamp retaining member, comprising a first retaining member retaining the one lamp unit, a second retaining member retaining the other lamp unit, a rotating shaft extended from the first retaining member toward the second retaining member, and a passage that houses the rotating shaft so as to allow the rotating shaft to slide and rotate and that is formed longitudinally inside the second retaining member, wherein when the one lamp unit is not rotated, the first retaining member is coupled to the second retaining member via the rotating shaft, and wherein when the one lamp unit is rotated, the first retaining member is bent on a front end of the rotating shaft at approximate right angles against the second retaining member, and the first retaining member is rotated 180 degrees around the rotating shaft, and then the rotating shaft is allowed to slide in the passage.

Another object of the present invention is to provide the backlight device, comprising a connecting member connected detachably to the bundling member, the connecting member supplying high ac voltage from a transformer on the inverter circuit board to at least one of electrodes of the plurality of lamps, the electrodes being connected to the bundling member, wherein each of the inverter circuit board is mounted with the connecting member corresponding to the bundling member.

Another object of the present invention is to provide the backlight device, comprising a connecting member connected detachably to the bundling member, the connecting member supplying high ac voltage from a transformer on the inverter circuit board to at least one of electrodes of the plurality of lamps, the electrodes being connected to the bundling member, wherein each of the inverter circuit board is mounted with the connecting member corresponding to the bundling member.

Another object of the present invention is to provide the backlight device, wherein the lamp unit is driven for one-side operation by a transformer on the inverter circuit board.

Another object of the present invention is to provide the backlight device, wherein the lamp unit is driven for double-side operation by a transformer on the inverter circuit board.

Another object of the present invention is to provide the backlight device, wherein each of the inverter circuit board is disposed on a face opposite to a face setting the lamp unit arranged thereon, and is located to be close to electrodes at both ends of the lamp unit.

Another object of the present invention is to provide a liquid crystal display apparatus comprising the backlight device, and a liquid crystal panel illuminated with the backlight device.

Another object of the present invention is to provide a lamp retaining method for retaining a plurality of lamp units each comprising a plurality of lamps having electrodes at both ends thereof, a bundling member bundling a wire from each of electrodes at one end of the plurality of lamps, and a conductive member connecting electrodes at the other end of the plurality of lamps through a conductive path, wherein the method is carried out to retain the vicinity of a central of each of lamps so arranged in parallel that the bundling members are set in the same direction, and to cause the one retained lamp unit to rotate relative to the other lamp unit adjacent thereto, and wherein the method is carried out to retain lamp units adjacent to each other so that the bundling member and the conductive member are arranged alternately after the one lamp unit has been rotated.

Another object of the present invention is to provide a lamp retaining member comprising a pair of basic substances, a lamp retaining portion disposed on each of the pair of basic substances, the lamp retaining portion retaining each of lamps arranged in rows; and a folding portion provided for folding the pair of basic substances in a direction of arrangement of rows of the lamps.

Another object of the present invention is to provide the lamp retaining member, wherein the lamp retaining portions located apart from each other across the folding portion are so arranged as to be at positions different from each other in the direction of arrangement of rows of the lamps when the basic substances are put in a folded state via the folding portion.

Another object of the present invention is to provide the lamp retaining member, wherein the lamp retaining portion disposed on the one basic substance has an opening allowing the lamp to be fitted in and removed from the lamp retaining portion, and the opening is so arranged as to face the other basic substance when the pair of basic substances are put in a folded state via the folding portion.

Another object of the present invention is to provide the lamp retaining member, wherein the plurality of lamp retaining portions are disposed on the one basic substance, and the lamp retaining portion disposed on the other basic substance is located between the plurality of lamp retaining portions disposed on the one basic substance when the pair of basic substances are put in a folded state via the folding portion.

Another object of the present invention is to provide the lamp retaining member, wherein the lamp retaining portions disposed on the pair of basic substances are arranged at every an equal interval when the pair of basic substances are put in an unfolded state.

Another object of the present invention is to provide the lamp retaining member, wherein each of the pair of basic substances has a mounting portion that is fitted on a component-mounting body, the mounting portion being disposed on a face opposite to a face setting the lamp retaining portions.

Another object of the present invention is to provide a backlight device comprising a plurality of lamps, a lamp retaining member having a pair of basic substances, a lamp retaining portion disposed on each of the pair of basic substances, the lamp retaining portion retaining each of lamps arranged in rows, and a folding portion provided for folding the pair of basic substances in a direction of arrangement of rows of the lamps, and a component-mounting body on which the lamp retaining member is mounted.

Another object of the present invention is to provide the backlight device, wherein the lamp retaining portions located apart from each other across the folding portion are so arranged as to be at positions different from each other in the direction of arrangement of rows of the lamps when the basic substances are put in a folded state via the folding portion.

Another object of the present invention is to provide the backlight device, wherein the lamp retaining portion disposed on the one basic substance has an opening allowing the lamp to be fitted in and removed from the lamp retaining portion, and the opening is so arranged as to face the other basic substance when the pair of basic substances are put in a folded state via the folding portion.

Another object of the present invention is to provide the backlight device, wherein the plurality of lamp retaining portions are disposed on the one basic substance, and the lamp retaining portion disposed on the other basic substance is located between the plurality of lamp retaining portions disposed on the one basic substance when the pair of basic substances are put in a folded state via the folding portion.

Another object of the present invention is to provide the backlight device, wherein the lamp retaining portions disposed on the pair of basic substances are arranged at every an equal interval when the pair of basic substances are put in an unfolded state.

Another object of the present invention is to provide the backlight device, wherein each of the pair of basic substances has a mounting portion that is fitted on the component-mounting body, the mounting portion being disposed on a face opposite to a face setting the lamp retaining portions.

Another object of the present invention is to provide the backlight device, wherein the lamp retaining member is provided as a pair of lamp retaining members so as to retain the vicinity of both ends of the plurality of lamps arranged in rows.

Another object of the present invention is to provide the backlight device, wherein among electrodes of the plurality of lamps, an electrode retained on a lamp retaining portion of the one basic substance is connected electrically to a lamp driving circuit, and wherein an electrode retained on a lamp retaining portion of the other basic substance is connected electrically to an electrode of the other lamp retained on the other lamp retaining portion of the same basic substance.

Another object of the present invention is to provide the backlight device, wherein the component-mounting body is a chassis that houses the lamps arranged in rows.

BRIEF DESCRIPTION OF THE DRAWINGS

FIGS. 6A and 6B depict exemplary configurations of a backlight device according to one embodiment of the present invention;

FIGS. 7A and 7B depict exemplary configurations of the backlight device according to another embodiment of the present invention;

FIGS. 9A and 9B are explanatory diagrams of examples of the arrangement of and a driving method for fluorescent lamps on the backlight device;

FIGS. 10A and 10B are explanatory diagrams of other examples of the arrangement of and the driving method for fluorescent lamps on the backlight device;

FIGS. 11A and 11B are explanatory diagrams of still other examples of the arrangement of and the driving method for fluorescent lamps on the backlight device;

PREFERRED EMBODIMENTS OF THE INVENTION

First Embodiment

Figure 1:
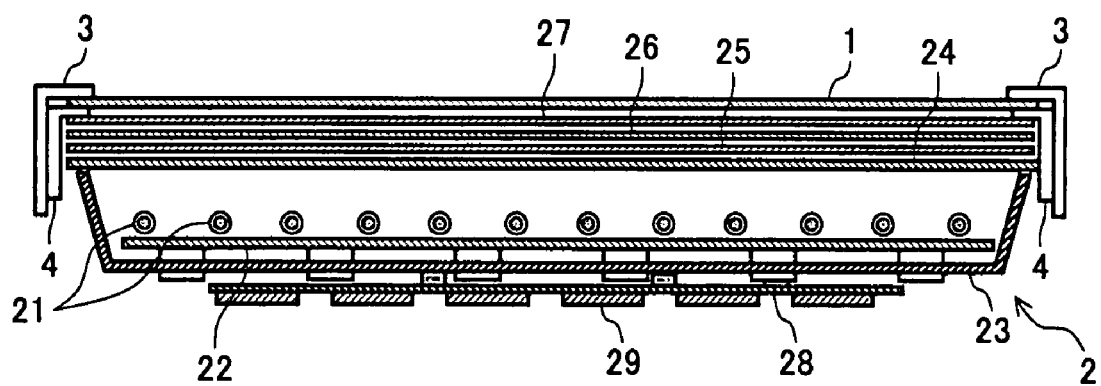
FIG. 1 is a sectional diagram of an exemplary configuration of a liquid crystal display apparatus using a backlight device according to the present invention.
Figure 2:
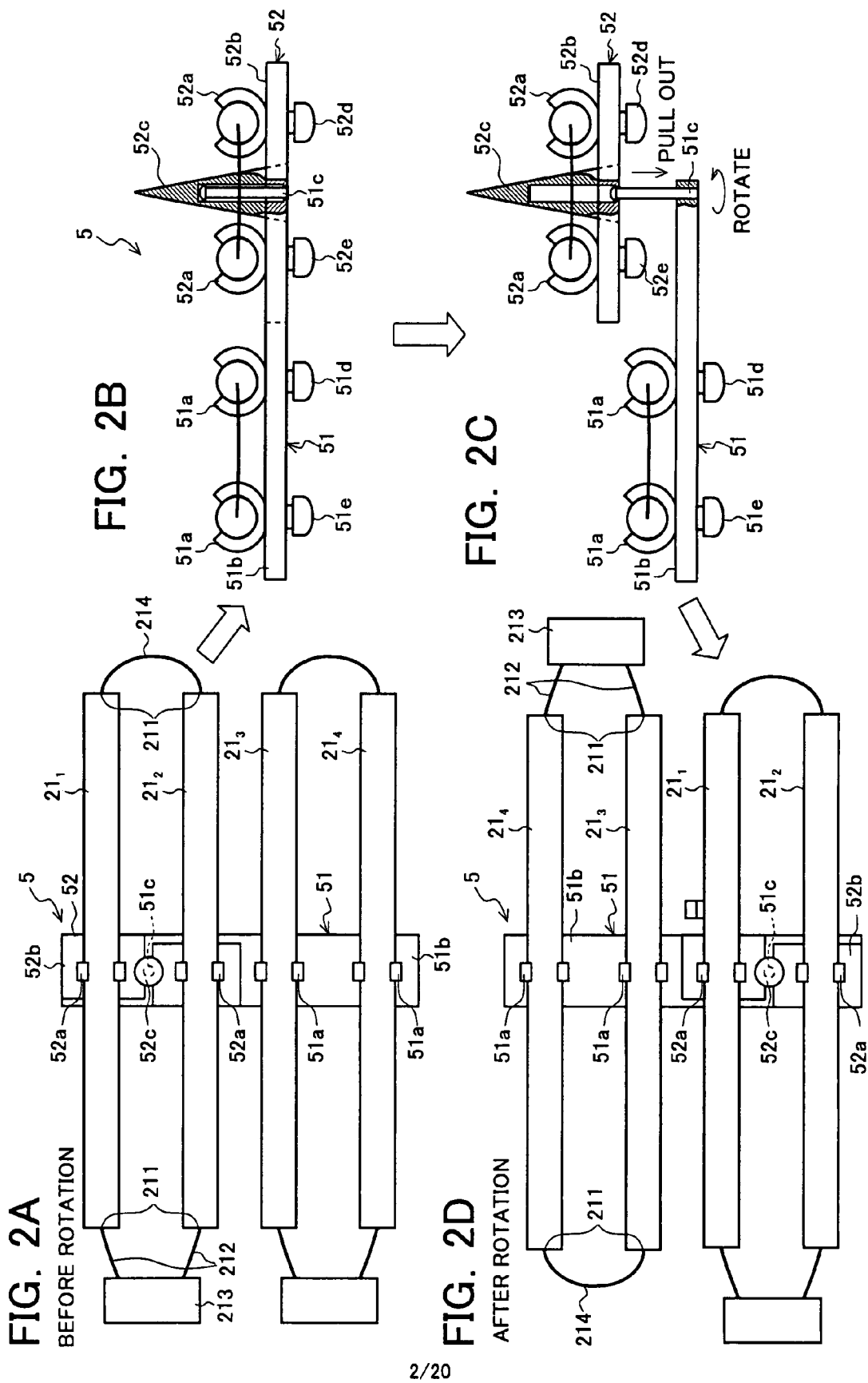
FIGS. 2A to 2D are explanatory diagrams of examples of a fluorescent lamp retaining method using a fluorescent lamp retaining member according to the present invention.

First embodiments of a fluorescent lamp retaining member, a backlight device having the fluorescent lamp retaining member, a liquid crystal display apparatus using the backlight device, and a fluorescent lamp retaining method according to the present invention will now be described with reference to the accompanying drawings. Components having the same function will be denoted by the same reference numerals to omit redundant explanation.

FIG. 1 is a sectional diagram of an exemplary configuration of the liquid crystal display apparatus using the backlight device according to the present invention. The liquid crystal display apparatus shown in FIG. 1 includes a liquid crystal panel 1 and the backlight device 2, which are main components of the liquid crystal display apparatus. The liquid crystal panel 1 displays an image corresponding to an image signal by supplying the image signal undergoing an image signal process to each pixel as a given gradational voltage according to a clock signal from the liquid crystal panel 1 and carrying out an image display process on the screen through sequential scanning. The backlight device 2 emits light from the opposite side of the display screen of the liquid crystal panel 1. The light source of the backlight device 2 consists of, for example, fluorescent lamps, such as cold cathode fluorescent lamps (CCFL).

The backlight device 2 includes a plurality of fluorescent lamps 21 that supply the liquid crystal panel 1 with light, a reflective sheet or reflective plate 22 (hereinafter represented by "reflective sheet") for effectively projecting light emitted from each fluorescent lamp 21 onto the liquid crystal panel 1, and an enclosure 23 that houses the fluorescent lamps 21 and the reflective sheet 22. Inverter circuit boards 28 (inverter circuits 28) carrying inverter circuits are disposed on the back face of the enclosure 23 (i.e., the face opposite to a face setting the fluorescent lamps 21). The inverter circuit 28 is provided with such a component as an inverter transformer 29 that serves as a pressure rising circuit supplying each fluorescent lamp 21 with power. The inverter transformer 29 is provided as, for example, a winding wire type inverter transformer that carries out voltage transformation through an electromagnetic induction effect by two coils on the basis of a coil turn ratio between the two coils.

The inverter circuit 28 is provided as, for example, a separately-excited inverter. A separately-excited inverter usually has a primary side oscillation circuit, and converts a direct current into an alternating current having a frequency identical with the driving frequency of the oscillation circuit. This separately-excited inverter is used for driving the above winding wire type inverter transformer 29 to offer a small-sized, highly efficient inverter that is a winding wire type but is superior to a piezoelectric type inverter.

The liquid crystal panel 1 is composed of two glass boards each having a polarizing plate, which glass boards are so set across a liquid crystal layer as to have a crossed Nicols relation. The liquid crystal panel 1 is fixed and held in the direction of its thickness with two frames 3 and 4. The frames 3 and 4 each have a bent structure with a section of an approximate L shape, which allows the frames 3 and 4 to cover the whole of the backlight device 2.

The fluorescent lamps 21 composing the backlight device 2 are linear shape, and are so arranged that the linear portions of the fluorescent lamps 21 are parallel with each other. The reflective sheet 22 has, for example, a plane shape as shown in FIG. 1, or may have an irregular section. The vicinity of central of the plurality of fluorescent lamps 21 is retained with the fluorescent lamp retaining member, which will be described later.

The liquid crystal display apparatus may further include various optical members according to optical functions needed for the liquid crystal display apparatus. As shown in FIG. 1, for example, the optical members include a diffusion plate 24 that eases a luminance difference between a place of arrangement of the fluorescent lamps 21 and a place other than the place of arrangement of the fluorescent lamps 21 for a light source consisting of the plurality of fluorescent lamps 21, a diffusion sheet 25 that supplies the liquid crystal display apparatus with an optimum light distribution characteristic in response to a required form of use of the liquid crystal display apparatus, a prism sheet 26 that condenses light traveling in a specific direction, and a reflective polarizing plate 27 that selectively transmits and reflects a polarized light wave of light traveling in a specific direction to improve the polarization rate of light incident on the liquid crystal panel 1. These various optical members (diffusion plate 24, diffusion sheet 25, prism sheet 26, reflective polarizing plate 27, etc.) have a platelike or sheetlike shape, and are disposed between the fluorescent lamps 21 and the liquid crystal panel 1.

The fluorescent lamp 21 operates in such a way that high ac voltage is supplied from the inverter transformer 29 of the inverter circuits 28, which are arranged substantially in parallel on the back face of the backlight device 2, to an electrode of the fluorescent lamp 21, and the supplied ac voltage excites mercury in the fluorescent lamp 21 up to an excited energy level, at which the mercury emits light close to ultraviolet light. This ultraviolet light causes fluorescent materials of red, blue, and green in the fluorescent lamp 21 to emit light having three emission colors, which then mixes together to provide white light. The light distribution characteristic of the emitted white light is controlled by each of the above optical members to supply effective light to the liquid crystal panel 1. As each pixel of the liquid crystal panel 1 is supplied with such light from the backlight device 2, the light of each pixel is controlled at a light transmission factor according to a given gradational voltage to display an image on the screen.

FIGS. 2A to 2D are explanatory diagrams of examples of the fluorescent lamp retaining method using the fluorescent lamp retaining member according to the present invention. In FIG. 2, 5 denotes the fluorescent lamp retaining member, which consists of a first retaining member 51 that retains two fluorescent lamps $21_3$ and $21_4$, and a second retaining member 52 that retains two fluorescent lamps $21_1$ and $21_2$. The first retaining member 51 has cramping portions 51a that cramp the vicinity of the central of the fluorescent lamps $21_3$ and $21_4$, a bottom 51b that supports the cramping portions 51a, a rotating shaft 51c that is erected on the bottom 51b, and nails 51d and 51e that fix the first retaining member 51 to a backlight enclosure. The second retaining member 52 has cramping portions 52a that cramp the vicinity of the central of the fluorescent lamps $21_1$ and $21_2$, a bottom 52b that supports the cramping portions 52a, a protruding portion 52c that so houses the rotating shaft 51c as to allow it to rotate and that is formed integrally with the bottom 52b, and nails 52d and 52e that fix the second retaining member 52 to the backlight enclosure.

Each set of the fluorescent lamps $21_1$ and $21_2$ and of the fluorescent lamps $21_3$ and $21_4$ forms a lamp unit. Each lamp unit has electrodes 211 formed at both ends of the lamp unit, a bundling member 213 that bundles a wire 212 from the electrodes 211 at one end, and a conductive member 214 that connects the electrodes 211 at the other end through a conductive path. The bundling member 213 is, for example, a plug or socket that connects the fluorescent lamp 21 electrically to the inverter circuit board. The bundling member 213 is connected to the inverter transformer on the inverter circuit board via a connecting member, which will be described later, and is supplied with high ac voltage from the inverter transformer. The conductive member 214 is, for example, an electric wire that connects the electrodes 211 through a conductive path. With the bundling member 213 and conductive member 214, the same configuration as provided by bent tube fluorescent lamps, such as U-shaped tubes, can be realized using straight tube fluorescent lamps.

Referring to FIG. 2A, when the fluorescent lamp retaining member 5 retains each of fluorescent lamps composing two sets of lamp units, the fluorescent lamp retaining member 5 retains the vicinity of the central of each of the fluorescent lamps that are so arranged in parallel rows that the bundling members 213 (or conductive members 214) are set in the same direction. FIG. 2B is a side view of the fluorescent lamp retaining member 5 shown in FIG. 2A. According to the fluorescent lamp retaining member 5, when the lamp unit is not rotated, the bottom 51b of the first retaining member 51 and the bottom 52b of the second retaining member 52 are so fitted together that the bottoms 51b and 52b do not overlap, which connects the first retaining member 51 to the second retaining member 52 via the rotating shaft 51c.

Figure 3:
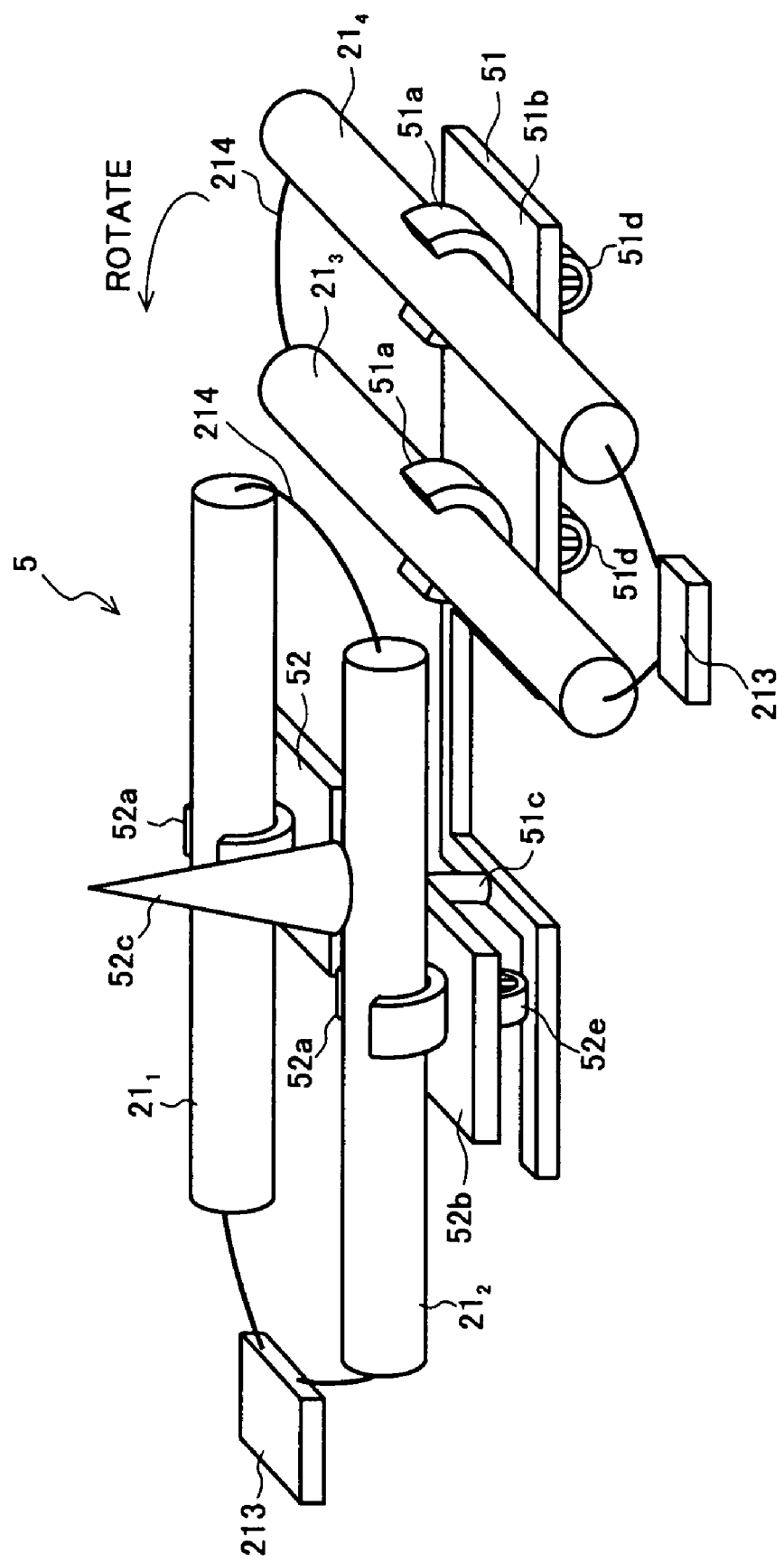
FIG. 3 is a perspective view of a state of rotation of the fluorescent lamp retaining member.

When the lamp unit is rotated, the first retaining member 51 is separated downward away from the second retaining member 52 to bring the first retaining member 51 into a rotatable position relative to the protruding portion 52c of the rotating shaft 51c, as shown in FIG. 2C. FIG. 3 depicts a state of rotation of the first retaining member 51 in the rotatable position. The diameter of the front end of the rotating shaft 51c is larger than the diameter of the shank of the rotating shaft 51c, and is larger than the diameter of a through-hole formed on the bottom of the protruding portion 52c. This through-hole is formed so that the rotating shaft 51c is inserted in and pulled out from the protruding portion 52c, and has a diameter larger than the diameter of the shank of the rotating shaft 51c and smaller than the diameter of the front end of the rotating shaft 51c. As a result, when the first retaining member 51 is separated away from the second retaining member 52, the front end of the rotating shaft 51c gets stuck in the bottom through-hole of the protruding portion 52c, which prevents the first retaining member 51 from coming off the second retaining member 52.

FIG. 3 is a perspective view of a state of rotation of the fluorescent lamp retaining member 5. Rotating the first retaining member 51 in an arrowed direction as shown in FIG. 3 brings the fluorescent lamp retaining member 5 into a state shown in FIG. 2D. Specifically, the lamp unit retained on the first retaining member 51 is rotated 180 degrees to be set in the reverse direction, so that the bundling members 213 and the conductive members 214 are arranged alternately on the lamp units adjacent to each other. Each lamp unit put in this state is housed in the enclosure of the backlight device shown in FIG. 1. This means that the high-voltage sides and the low-voltage sides are arranged alternately.

Figure 4:
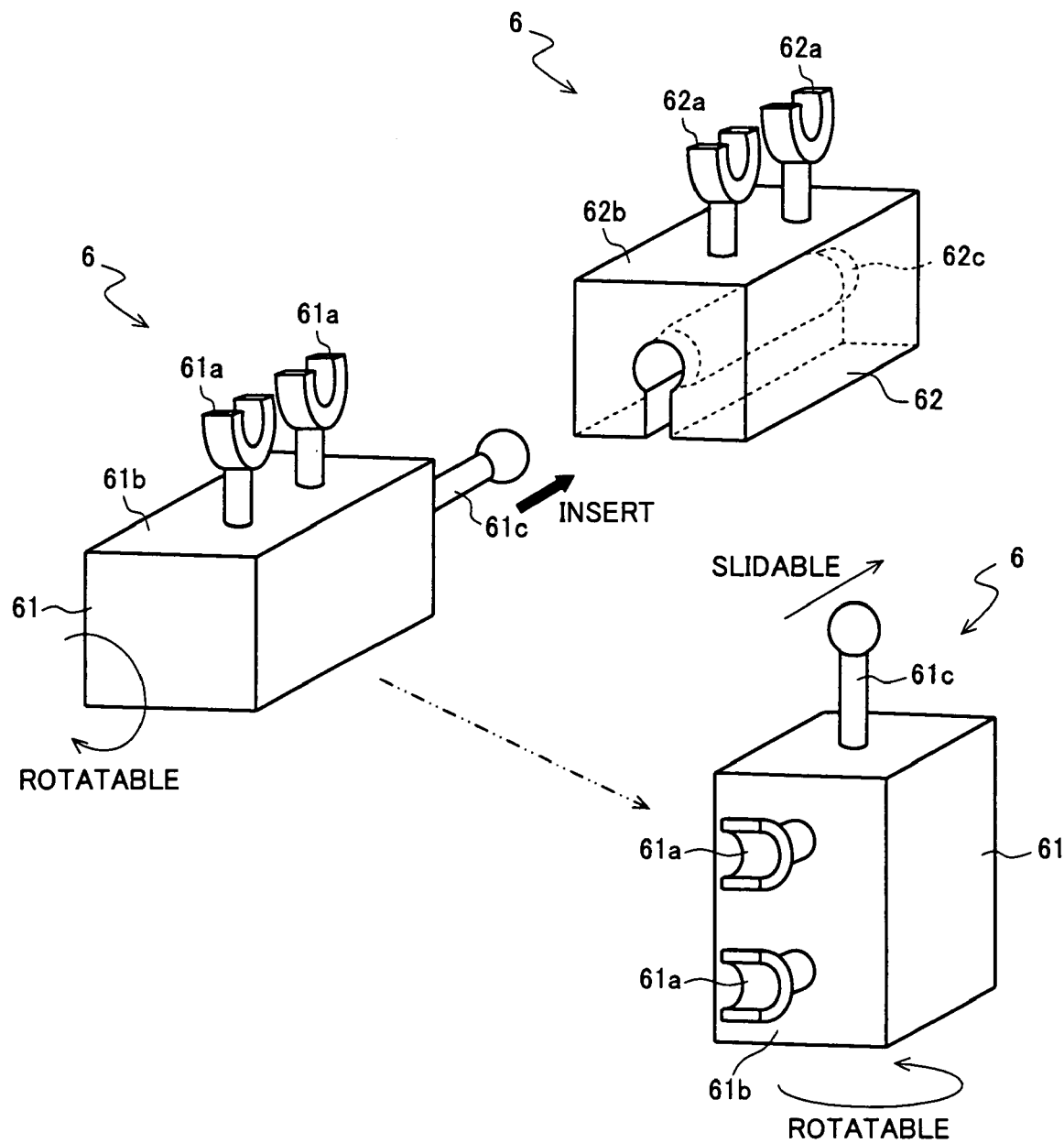
FIG. 4 is an explanatory diagram of another example of the fluorescent lamp retaining method using a fluorescent lamp retaining member according to the present invention.

FIG. 4 is an explanatory diagram of another example of the fluorescent lamp retaining method using a fluorescent lamp retaining member according to the present invention. In FIG. 4, 6 denotes the fluorescent lamp retaining member, which consists of a first retaining member 61 retaining two fluorescent lamps, and a second retaining member 62 retaining two fluorescent lamps. The first retaining member 61 has cramping portions 61a that cramp the vicinity of the central of each fluorescent lamps, a bottom 61b that supports the cramping portions 61a, and a rotating shaft 61c that is extended from a side face of the bottom 61b toward the second retaining member 62. The second retaining member 62 has cramping portions 62a that cramp the vicinity of the central of the fluorescent lamps, a bottom 62b that supports the cramping portions 62a, and a passage 62c formed longitudinally inside the bottom 62b, which passage 62c so houses the rotating shaft 61c as to allow it slide and rotate. The fluorescent lamp retaining member 6 is also provided with nails that fix the first and second retaining members 61 and 62 to the backlight enclosure, but the description of the nails is omitted here.

In this example, the front end of the rotating shaft 61c is formed into a spherical shape, whose diameter is larger than the diameter of the shank of the rotating shaft 61c. The passage 62c has openings (opening ends) formed at both side ends and a passage portion formed at the inside of the openings, and the diameter of the passage portion is larger than that of the opening ends. The diameter of the opening ends is smaller than the diameter of the front end of the rotating shaft 61c, and is larger than the diameter of the shank. The diameter of the passage portion is larger than that of the front end of the rotating shaft 61c. In this structure, the front end of the rotating shaft 61c can slide and rotate inside the passage 62c. Since the diameter of the front end of the rotating shaft 61c is larger than the diameter of the openings of the passage 62c, the front end cannot pass through the opening ends while the shank of the rotating shaft 61c can pass through the opening ends. The first retaining member 61 and the second retaining member 62, therefore, can be arranged across a given distance (i.e., the length of the shank of the rotating shaft 61c).

While the front end of the rotating shaft 61c is inserted in the passage 62c, the first retaining member 61 and the second retaining member 62 are set parallel with each other, and then one or both of retaining members are pulled in a direction where both retaining members move away from each other. As a result, the front end of the rotating shaft 61c gets stuck at the opening end of the passage 62c to stop there. In this manner, the first retaining member 61 and the second retaining member 62 are kept coupled via the rotating shaft 61c when the lamp unit is not rotated.

Figure 5A:
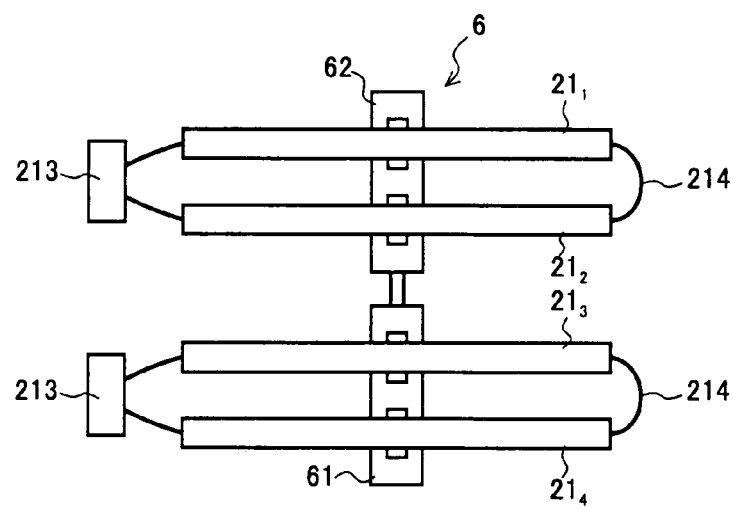
FIGS. 5A to 5C depict examples of the state of lamps that results when the fluorescent lamps retained on the fluorescent lamp retaining member shown in FIG. 4 are rotated.
Figure 5B:
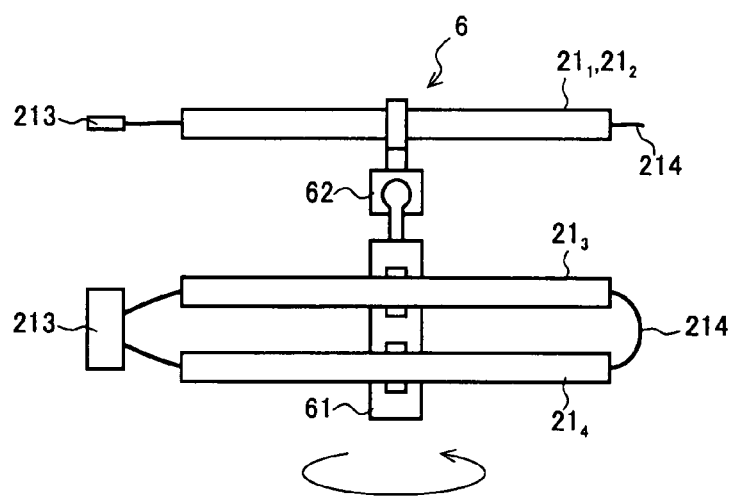
Figure 5C:
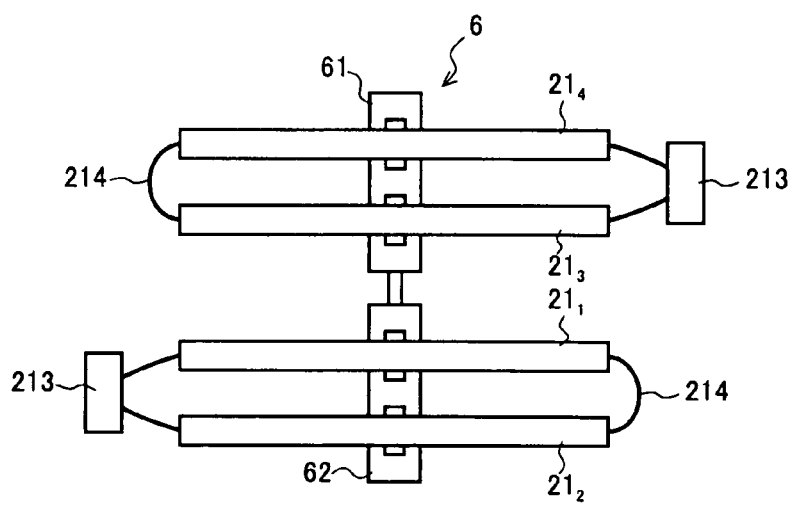

FIGS. 5A to 5C depict examples of the state of the fluorescent lamps 21 that results when the fluorescent lamps 21 kept retained on the fluorescent lamp retaining member 6 shown in FIG. 4 is rotated. As shown in FIG. 5A, when the lamp unit is not rotated, the first retaining member 61 retains the vicinity of the central of the fluorescent lamps $21_3$ and $21_4$ so arranged in parallel that the bundling member 213 (or conductive member 214) is set in the same direction. Likewise, the second retaining member 62 retains the vicinity of the central of the fluorescent lamps $21_1$ and $21_2$ so arranged in parallel that the bundling member 213 (or conductive member 214) is set in the same direction.

When the lamp unit is rotated, as shown in FIG. 5B, the first retaining member 61 is bent at approximate right angles to the second retaining member 62 on the front end of the rotating shaft 61c, and the first retaining member 61 is rotated 180 degrees around the rotating shaft 61c in an arrowed direction, and then the rotating shaft 61c is slid along the passage 62c up to the opening end on the other side.

As shown in FIG. 5C, when the rotation of the lamp unit is over, the fluorescent lamps $21_3$ and $21_4$ retained on the first retaining member 61 have been turned against the fluorescent lamps $21_1$ and $21_2$ retained on the second retaining member 62 at 180 degrees. Thus, the bundling members 213 and the conductive members 214 are arranged alternately.

In this manner, when the lamp units each composed of two fluorescent lamps, the bundling member, and the conductive member are arranged, the lamp units are arranged at first in a state where the bundling members (sockets or plugs) at the high-voltage side are set in the same direction. Then, one lamp unit is rotated against the other adjacent lamp unit to arrange the high-voltage side (bundling member) and the low-voltage side (conductive member) alternately. This eliminates a need of considering the position of electrodes, which consideration is required when bent tube fluorescent lamps of a U shape, etc., are arranged, to prevent the occurrence of work of shifting a lamp from one hand to the other, thus facilitates arrangement work. When the arranged lamp units are connected to the inverter circuit board, the only work to do is to fit the bundling members at the lamp unit side to the connecting members at the inverter circuit board side. Thus, a production worker can prevent erroneous mounting and breakage of a fluorescent lamp upon carrying out fluorescent lamp arrangement work, being able to perform easy and certain mounting work.

Each embodiment of the backlight device will then be described. According to the embodiment, the backlight device prevents erroneous mounting and breakage of a fluorescent lamp upon fluorescent lamp mounting work, and reduces or eliminates the irregularities of luminance of the backlight due to a luminance difference arising in the direction of axis of the fluorescent lamps as the fluorescent lamp retaining member shown in FIGS. 2A to 5C is used to arrange a plurality of lamp units on the backlight device.

FIGS. 6A and 6B depict exemplary configurations of the backlight device 2 according to one embodiment of the present invention. In FIG. 6A, 211R denotes one electrode of the fluorescent lamp 21, 212R denote a wire from the electrodes 211R, 213R denotes a bundling member that bundles the wire 212R, and 214R denotes a conductive member that connects adjacent separate two electrodes 211R through a conductive path. Likewise, 211L denotes the other electrode of the fluorescent lamp 21, 214L denotes a conductive member that connects the electrodes 211L through a conductive path, 212L denotes a wire from adjacent separate two electrodes 211L, and 213L denotes a bundling member that bundles the wire 212L.

Each set of the electrodes 211R and 211L, of the wires 212R and 212L, of the bundling members 213R and 213L, and of the conductive members 214R and 214L is composed of the same member. The electrodes 211R and 211L are represented as the electrode 211, the wires 212R and 212L as the wire 212, the bundling members 213R and 213L as the bundling member 213, and the conductive members 214R and 214L as the conductive member 214 from time to time.

On the backlight device 2, a plurality of lamp units are arranged. Each lamp unit includes two fluorescent lamps 21 each having the electrode 211 on both sides, the bundling member 213 that bundles the wire 212 from each of the electrodes at one end of two fluorescent lamps 21, and the conductive member 214 that connects the electrodes at the other end of two fluorescent lamps 21 through a conductive path. Each fluorescent lamp retaining member 5 retains a set of two lamp units in such a way that the bundling members 213 and the conductive members 214 are arranged alternately.

The backlight device 2 further includes a pair of inverter circuit boards 28R and 28L for turning on the plurality of lamp units, and connecting members 30R and 30L. The connecting members 30R and 30L are connected to the bundling members 213R and 213L, respectively, and supply high ac voltage from inverter transformers 29R and 29L on the inverter circuit boards 28R and 28L to one of two fluorescent lamp electrodes 211R and of two fluorescent lamp electrodes 211L connected to the bundling members 213R and 213L. Lamp units adjacent to each other on the backlight device 2 are so arranged that the bundling members 213 and the conductive members 214 are set at alternate positions.

Each set of the inverter circuit boards 28R and 28L, of the inverter transformers 29R and 29L, and of the connecting members 30R and 30L is composed of the same member. The inverter circuit boards 28R and 28L are represented as the inverter circuit board 28, the inverter transformers 29R and 29L as the inverter transformer 29, and the connecting members 30R and 30L as a connecting member 30 from time to time.

Referring to FIG. 6A, six lamp units (12 fluorescent lamps 21) are arranged in rows. Each lamp unit includes two fluorescent lamps 21, the bundling member 213, and the conductive member 214. The paired inverter circuit boards 28R and 28L are disposed on the face that is opposite to the face setting a plurality of lamp units arranged thereon. On the opposite face, the inverter circuit boards 28R and 28L are disposed to be close to the electrodes at both ends of the lamp units. The inverter circuit boards 28R and 28L are mounted with the connecting members 30R and 30L that correspond to the bundling members 213R and 213L, respectively.

The connecting members 30R at the high-voltage side of the lamp units are mounted on the inverter circuit board 28R at one side. At one end side of the lamp units, therefore, the bundling members 213R connected to the connecting members 30R and the conductive members 214R at the low-voltage side are arranged alternately in descending order. Likewise, the connecting members 30L at the high-voltage side of the lamp units are mounted on the inverter circuit board 28L at the other side. At the other end side of the lamp units, therefore, the conductive members 214L at the low-voltage side and the bundling members 213L connected to the connecting members 30L are arranged alternately in descending order. At the high-voltage side, the lamp unit is connected to the inverter transformer 29. At the low-voltage side, electrodes of the fluorescent lamps 21 are connected through a conductive path.

According to the present embodiment, at the high-voltage side of the lamp unit (where the inverter transformer 29 is connected to the lamp unit), high ac voltage from the inverter transformer 29 is supplied to one of two electrodes 211 while the other electrode 211 is grounded. The lamp unit is, therefore, driven for one-side operation by the inverter transformer 29.

The connecting members 30R and 30L are connected detachably to the bundling members 213R and 213L, respectively. The connecting member 30 is, for example, a socket (reception side), and the bundling member 213 is, for example, a plug (insertion side). Connecting the socket to the plug electrically connects electrodes at one side of the lamp unit to the inverter transformer 29. The function of the socket and the plug may be reversed with respect to the connecting member 30 and the bundling member 213. In this case, the connecting member 30 works as the plug while the bundling member 213 works as the socket.

This configuration offers the same effect as an effect obtained by putting the electrode side and the bent side of conventional bent tube fluorescent lamps into alternate arrangement. Namely, as shown in FIG. 6B, the high-voltage side and the low-voltage side of the lamp unit are arranged alternately. This reduces a luminance difference in the direction of the tube axis, and reduces or eliminates the irregularities of luminance of the backlight.

When the lamp units each including two fluorescent lamps 21, the bundling member 213, and the conductive member 214 are arranged, the lamp units are arranged at first in a state where the bundling members (sockets or plugs) 213 at the high-voltage side are set in the same direction. Then, one lamp unit is rotated against the other adjacent lamp unit to arrange the high-voltage side (bundling member 213) and the low-voltage side (conductive member 214) alternately. This eliminates a need of considering the position of electrodes, which consideration is required when bent tube fluorescent lamps of a U shape, etc., are arranged, to prevent the occurrence of work of shifting a lamp from one hand to the other, thus facilitates setting work. When the set lamp units are connected to the inverter circuit board 28, the only work to do is to fit the bundling members 213 at the lamp unit side to the connecting members 30 at the inverter circuit board side. Thus, a production worker can prevent erroneous mounting and breakage of a fluorescent lamp upon carrying out fluorescent lamp setting work, being able to perform easy and certain setting work.

A conventional bent tube fluorescent lamp is formed into a bent structure, which gives the conventional bent tube fluorescent lamp a length in the longish side that is about half of that of a straight tube fluorescent lamp having the total length equal to that of the bent tube fluorescent lamp. For this reason, the conventional bent tube fluorescent lamp poses a limit in application to a large-scale screen. The backlight device 2 according to the present invention employs straight tube fluorescent lamps, thus applicable to a large-scale screen.

FIGS. 7A and 7B depict exemplary configurations of the backlight device 2 according to another embodiment of the present invention. Referring to FIG. 7A, the backlight device 2 has the same configuration as the backlight device 2 according to the embodiment shown in FIGS. 6A and 6B except that the configuration of the inverter transformer 29 and connecting member 30 is different. The connecting member 30 of the present embodiment is connected to the bundling member 213, and supplies high ac voltage from the inverter transformers 29 on the inverter circuit board 28 to both of the electrodes 211 of two fluorescent lamps 21 connected to the bundling member 213. Each of the inverter transformers 29 is disposed in one-to-one correspondence to each of both electrodes 211, so that the inverter transformers 29 are capable of supplying high ac voltage to both electrodes 211. The lamp unit, therefore, is driven for double-side operation by two inverter transformers 29.

This configuration offers the same effect as an effect obtained by putting the electrode side and the bent side of conventional bent tube fluorescent lamps in alternate arrangement. Namely, as shown in FIG. 7B, the high-voltage side and the low-voltage side of the lamp unit are arranged alternately. This reduces a luminance difference in the direction of the tube axis, and reduces or eliminates the irregularities of luminance of the backlight.

Figure 8A:
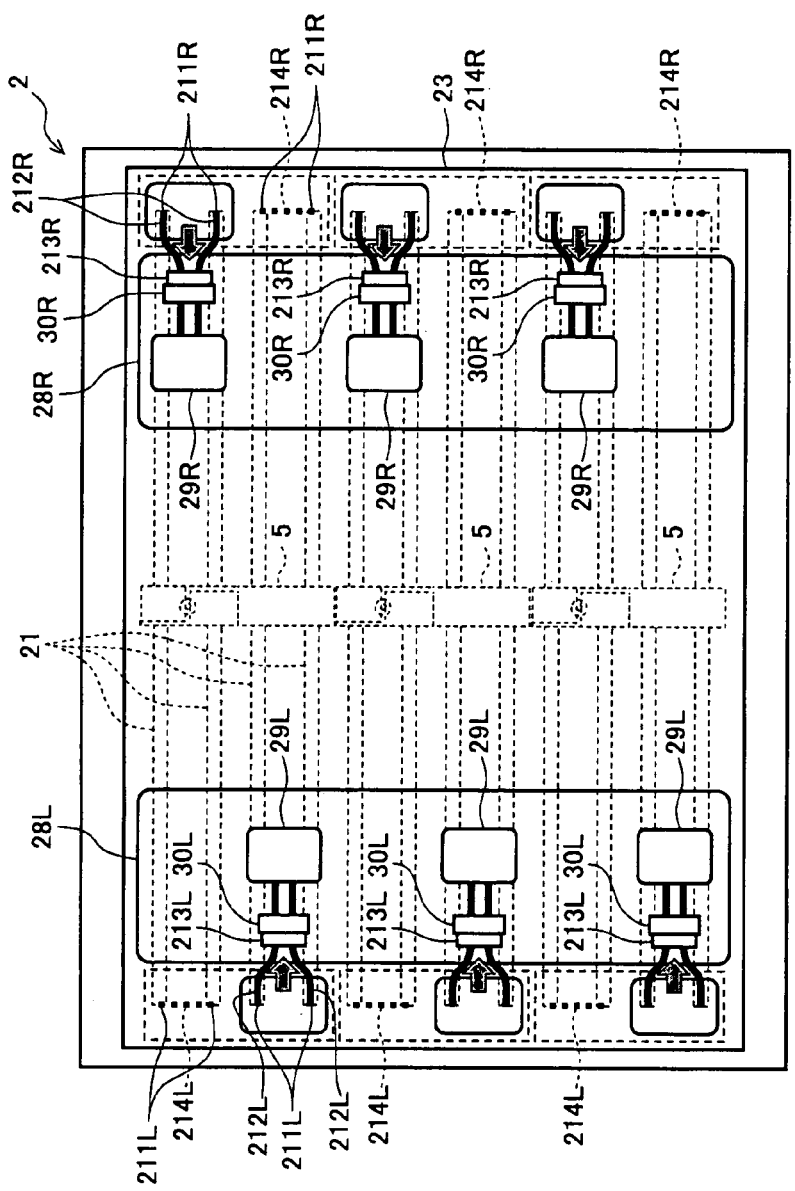
FIGS. 8A and 8B depict exemplary configurations of the backlight device according to still another embodiment of the present invention.
Figure 8B:
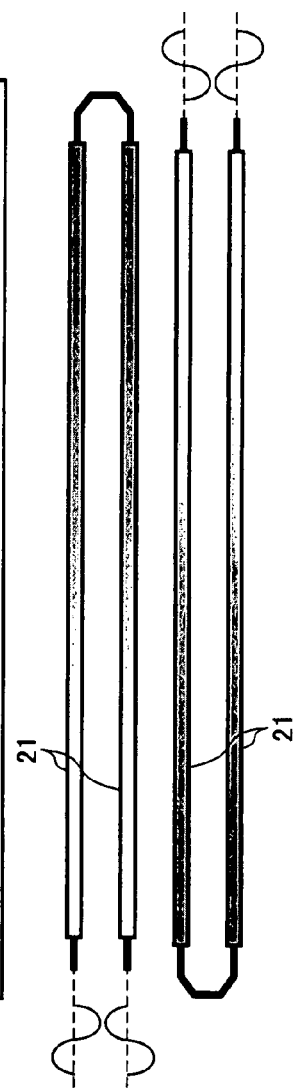

FIGS. 8A and 8B depict exemplary configurations of the backlight device 2 according to still another embodiment of the present invention. Referring to FIG. 8A, the backlight device 2 has the same configuration as the backlight device 2 according to the embodiment shown in FIGS. 6A and 6B, except that the configuration of the inverter transformer 29 and connecting member 30 is different. The connecting member 30 of the present embodiment is connected to the bundling member 213, and supplies high ac voltage from the inverter transformer 29 on the inverter circuit board 28 to both of electrodes 211 of two fluorescent lamps 21 connected to the bundling member 213. One inverter transformer 29 is disposed in correspondence to both electrodes 211, being capable of supplying high ac voltage to both electrodes 211. The lamp unit, therefore, is driven for double-side operation by one inverter transformer 29.

This configuration offers the same effect as an effect obtained by putting the electrode side and the bent side of conventional bent tube fluorescent lamps in alternate arrangement. As shown in FIG. 8B, the high-voltage side and the low-voltage side of the lamp unit are arranged alternately. This reduces a luminance difference in the direction of the tube axis, and reduces or eliminates the irregularities of luminance of the backlight.

As described above, according to the present invention, when the lamp units each including two fluorescent lamps, the bundling member, and the conductive member are arranged, the lamp units are arranged at first in a state where the bundling members (sockets or plugs) at the high-voltage side are set in the same direction. Then, one lamp unit is rotated against the other adjacent lamp unit to arrange the high-voltage side (bundling member) and the low-voltage side (conductive member) alternately. This eliminates a need of considering the position of electrodes, which consideration is required when bent tube fluorescent lamps of a U shape, etc., are arranged, to prevent the occurrence of work of shifting a lamp from one hand to the other, thus facilitates arrangement work. When the set lamp units are connected to the inverter circuit board, the only work to do is to fit the bundling members at the lamp unit side to the connecting members at the inverter circuit board side. Thus, a production worker can prevent erroneous mounting and breakage of fluorescent lamps upon carrying out fluorescent lamp setting work, being able to perform easy and certain mounting work.

Second Embodiment

Second embodiments of the present invention will then be described with reference to the accompanying drawings. Components having the same function will be denoted by the same reference numerals in all drawings for the description of the embodiments to omit redundant explanation of the components.

Description will be given for an exemplary configuration of the liquid crystal display apparatus using the backlight device according to the present invention based on a sectional diagram as shown in FIG. 1 described above. The liquid crystal display apparatus includes the liquid crystal panel 1 and the backlight device 2, which are main components of the liquid crystal display apparatus. The liquid crystal panel 1 displays an image corresponding to an image signal by supplying the image signal undergoing an image signal process to each pixel as a given gradational voltage according to a clock signal from the liquid crystal panel 1 and carrying out sequential scanning over the screen.

The backlight device 2 emits light from the back side of the liquid crystal panel 1. The light source of the backlight device 2 consists of, for example, cold cathode fluorescent lamps (CCFL).

The backlight device 2 includes a plurality of fluorescent lamps 21 that supply the liquid crystal panel 1 with light, the reflective sheet or reflective plate 22 (hereinafter represented by "reflective sheet") for effectively projecting light emitted from each fluorescent lamp 21 onto the liquid crystal panel 1, and the enclosure 23 (chassis) that houses the fluorescent lamps 21 and the reflective sheet 22. The enclosure 23 is equivalent to a component-mounting body according to the present invention.

Inverter circuit boards 28 carrying inverter circuits corresponding to a lamp driving circuit of the present invention are disposed on the back face side of the enclosure 23. The inverter circuit board 28 is provided with such a component as the inverter transformer 29 that serves as a step-up circuit supplying each fluorescent lamp 21 with power. The inverter transformer 29 is provided as, for example, a winding wire type inverter transformer that carries out voltage transformation through an electromagnetic induction effect by two coils on the basis of a coil turn ratio between the two coils.

The inverter circuit is provided as, for example, a separately-excited inverter. A separately-excited inverter usually has a primary side oscillation circuit, and converts a direct current into an alternating current having a frequency identical with the driving frequency of the oscillation circuit. This separately-excited inverter is used for driving the above winding wire type inverter transformer 29 to offer a small-sized, highly efficient inverter that is a winding wire type but is superior to a piezoelectric inverter.

The liquid crystal panel 1 is composed of two glass boards each having a polarizing plate, which glass boards are so set across a liquid crystal layer as to have a crossed Nicols relation. The liquid crystal panel 1 is fixed and retained with two frames 3 and 4. The frames 3 and 4 each have a bent structure with a section of an approximate L shape, which allows the frames 3 and 4 to cover the whole of the backlight device 2.

The fluorescent lamps 21 composing the backlight device 2 have a straight tube shape, and are so arranged that the linear portions of the fluorescent lamps 21 are parallel with each other.

The fluorescent lamps 21 of a straight tube shape are used for the backlight according to the present embodiment, on which electrodes at one side of two fluorescent lamps are connected to drive the two fluorescent lamps in the same manner as a U-shaped tube is driven. Such a set of connected two fluorescent lamps is called a pseudo-U-shaped tube in the present specification. An exemplary configuration of the pseudo-U-shaped tube and a specific example of a driving method for the pseudo-U-shaped tube will be described later.

The liquid crystal display apparatus further includes various optical members according to optical capabilities needed for the liquid crystal display apparatus. For example, the liquid crystal display apparatus may include the diffusion plate 24 that diffuses light from the fluorescent lamp 21, the diffusion sheet 25 that controls a light distribution characteristic, the prism sheet 26 that condenses light traveling in a specific direction, and the reflective polarizing plate 27 that selectively transmits and reflects a polarized light wave of light traveling in a specific direction to improve a polarization rate.

The reflective sheet 22 has, for example, a plane shape as shown in FIG. 1, or may have an irregular section.

An electrode of the fluorescent lamp 21 is supplied with high ac voltage from the inverter transformer 29 of the inverter circuit boards 28, which are arranged substantially in parallel on the back face of the backlight device 2. This high ac voltage excites mercury in the fluorescent lamp 21 up to an excited energy level, at which the mercury emits light close to ultraviolet light. This ultraviolet light causes fluorescent materials of red, blue, and green formed on the tube wall of the fluorescent lamp 21 to emit light having three emission colors, which then mixes together to produce white light.

The emitted white light is subjected to the effects of the above various optical members, and is projected onto the liquid crystal panel 1 from the back face side thereof. Meanwhile, a light transmission factor at each pixel of the liquid crystal panel 1 is controlled according to a given gradational voltage. Hence an image is displayed on the screen of the liquid crystal panel 1.

FIGS. 9A and 9B are explanatory diagrams of examples of the arrangement of and a driving method for the fluorescent lamps on the backlight device, FIG. 9A is an explanatory diagram of the arrangement of the fluorescent lamps and an example of the connection configuration of the inverter transformers, and FIG. 9B is an explanatory diagram of the driving method for the fluorescent lamps put in the arrangement shown in FIG. 9A.

In FIGS. 9A and 9B, 30 denotes the connecting member disposed on the inverter circuit board, 100 denotes a pseudo-U-shaped tube consisting of two straight tube fluorescent lamps 21, 101a and 101b denote the electrodes of the fluorescent lamp 21, 102 denotes a lead wire connected to the electrodes 101a, 103 denotes a socket, and 104 denotes a lead wire that connects the electrodes 101b together.

A pseudo-U-shaped tube structure is employed for the backlight of the present embodiment, which pseudo-U-shaped tube structure is constructed by connecting separate electrodes at one side of two straight tube fluorescent lamps 21 via a lead wire. Use of the pseudo-U-shaped tube structure offers an advantage of making handling of the pseudo-U-shaped tube easier than handling of a conventional U-shaped tube to facilitate assembling of the backlight. The pseudo-U-shaped tube structure offers an additional advantage of flexibility in responding to an alteration in a pitch of arrangement of fluorescent lamps, which flexibility a U-shaped tube does not have. A pseudo-U-shaped tube can be turned on using the same number of inverters as that of inverter used for turning on a conventional U-shaped tube.

According to the present embodiment, a lamp unit composed of a plurality of pseudo-U-shaped tubes is set in advance on a foldable lamp retaining member. This remarkably reduces a space occupied by fluorescent lamps upon packaging the fluorescent lamps, and eliminates a need of work of checking or reversing the direction of fluorescent lamps upon mounting the fluorescent lamps, thus enables easy and certain mounting of fluorescent lamps. A specific example of the configuration of such a lamp unit composed of pseudo-U-shaped tubes will be described later.

Referring to FIGS. 9A and 9B, a plurality of pseudo-U-shaped tubes 100 are arranged in parallel with each other. Each pseudo-U-shaped tube 100 is constructed by connecting separate electrodes 101b at one side of two straight tube fluorescent lamps 21 via the lead wire 104. Separate electrodes 101a at the other side of the straight tube fluorescent lamps 21 are connected to the socket 103 via the lead wire 102. The socket 103 is connected to the connecting member 30 on the inverter circuit board 28.

A pair of inverter circuit boards 28, one of which is on the left and the other on the right, are disposed on the back face side of the enclosure 23, where the inverter circuit boards 28 are located close to the electrodes at both ends of the fluorescent lamps 21. Here, the electrodes 101a connected to the inverter circuit board 28 are defined as the drive side, and the electrodes 101b connected together via the lead wire 104 are defined as the middle side.

In this example, high ac voltage from the inverter transformer 29 on the inverter circuit board 28 is supplied to the drive side electrode 101a of one fluorescent lamp 21 out of two drive side electrodes 101a of two fluorescent lamps 21. At this time, the drive side electrode 101a of the other fluorescent lamp 21 out of two drive side electrodes 101a is grounded. The pseudo-U-shaped tube 100 is, therefore, driven for one-side operation by one inverter transformer 29 to light up.

The plurality of pseudo-U-shaped tubes 100 are so arranged that the drive side electrodes 101a and the middle side electrodes 101b are set in alternate positions. In other words, on the backlight device provided with rows of the plurality of pseudo-U-shaped tubes, adjacent pseudo-U-shaped tubes are so arranged that the directions of the electrodes connected to the socket 103 are different from each other between the pseudo-U-shaped tubes.

As a result, the drive side electrodes 101a connected to the inverter transformer are arranged alternately on the left and on the right at each pseudo-U-shaped tube. This compensates for irregularities of luminance arising in the direction of the tube axis between the high-voltage side and the ground side, reducing the irregularities of luminance of the backlight.

FIGS. 10A and 10B are explanatory diagrams of other examples of the arrangement of and the driving method for the fluorescent lamps on the backlight device, FIG. 10A is an explanatory diagram of the arrangement of the fluorescent lamps and an example of the connection configuration of the inverter transformers, and FIG. 10B is an explanatory diagram of the driving method for the fluorescent lamps put in the arrangement shown in FIG. 10A.

According to the configuration shown in FIGS. 10A and 10B, the pseudo-U-shaped tube 100 is driven for double-side operation by two inverter transformers, and the configuration of other components is the same as shown in FIGS. 9A and 9B.

In this example, two inverter transformers 29 are connected to both drive side electrodes 101a of two fluorescent lamps 21, respectively, so that high ac voltages having phases reverse to each other are supplied to both electrodes 101a, respectively. Thus, the pseudo-U-shaped tube 100 is driven for double-side operation by two inverter transformers 29 to light up.

The plurality of pseudo-U-shaped tubes 100 are so arranged that the drive side electrodes 101a and the middle side electrodes 101b are set in alternate positions, which puts the drive side electrodes 101a connected to the inverter transformers 29 in alternate arrangement on the left and on the right at each pseudo-U-shaped tube 100. This compensates for irregularities of luminance arising in the direction of the tube axis between the drive side and the middle side, reducing the irregularities of luminance of the backlight.

FIGS. 11A and 11B are explanatory diagrams of still another example of the arrangement of and the driving method for the fluorescent lamps on the backlight device, FIG. 11A is an explanatory diagram of the arrangement of the fluorescent lamps and an example of the connection configuration of the inverter transformers, and FIG. 11B is an explanatory diagram of the driving method for the fluorescent lamps put in the arrangement shown in FIG. 11A.

According to the configuration shown in FIGS. 11A and 11B, the pseudo-U-shaped tube 100 is driven for double-side operation by one inverter transformer, and the configuration of other components is the same as shown in FIGS. 9A and 9B.

In this example, one inverter transformer 29 is connected to both drive side electrodes 101a of two fluorescent lamps 21, so that high ac voltages having phases reverse to each other are supplied to both electrodes 101a, respectively. Thus, the pseudo-U-shaped tube 100 is driven for double-sided operation by one inverter transformer 29 to light up.

The plurality of pseudo-U-shaped tubes 100 are so arranged that the drive side electrodes 101a and the middle side electrodes 101b are set in alternate positions, which puts the drive side electrodes 101a connected to the inverter transformer 29 in alternate arrangement on the left and on the right at each pseudo-U-shaped tube 100. This compensates for irregularities of luminance arising in the direction of the tube axis between the high-voltage side and the middle side, reducing the irregularities of luminance of the backlight.

Figure 12:
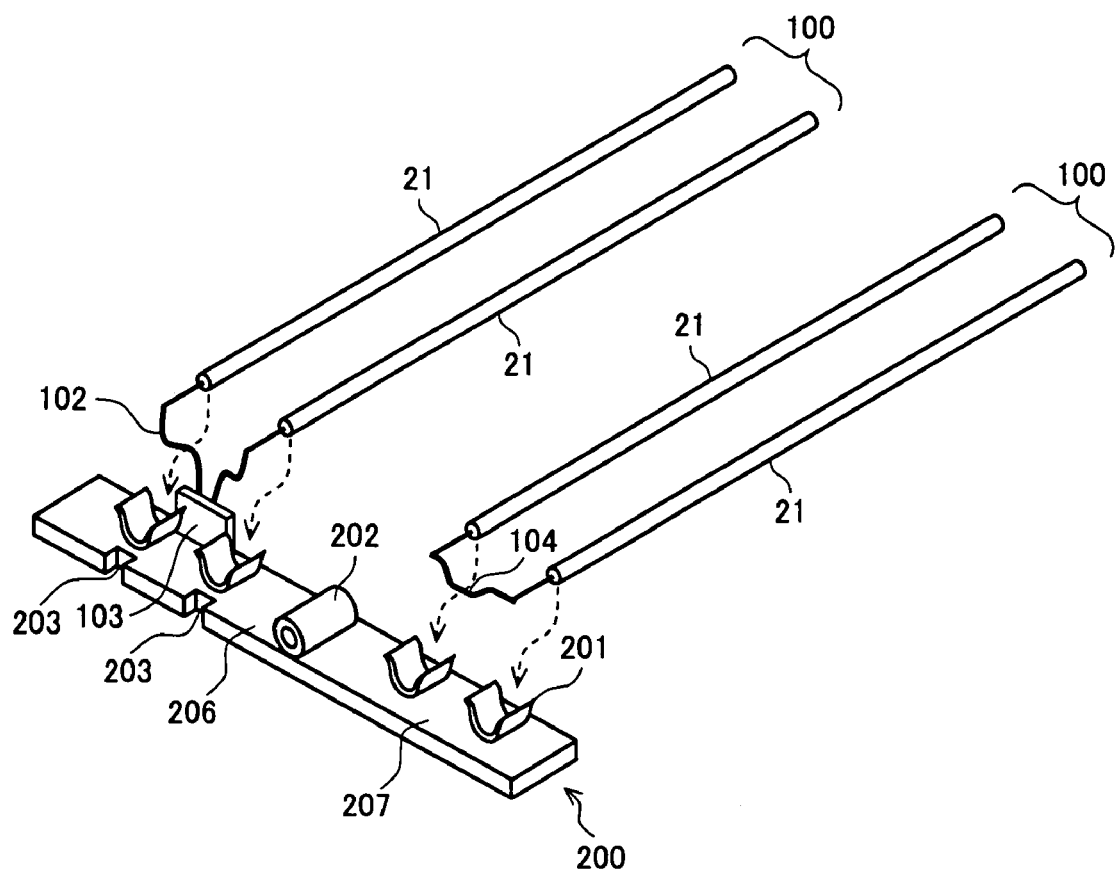
FIG. 12 is an explanatory diagram of an exemplary configuration of a lamp retaining member according to the present invention.
Figure 13:
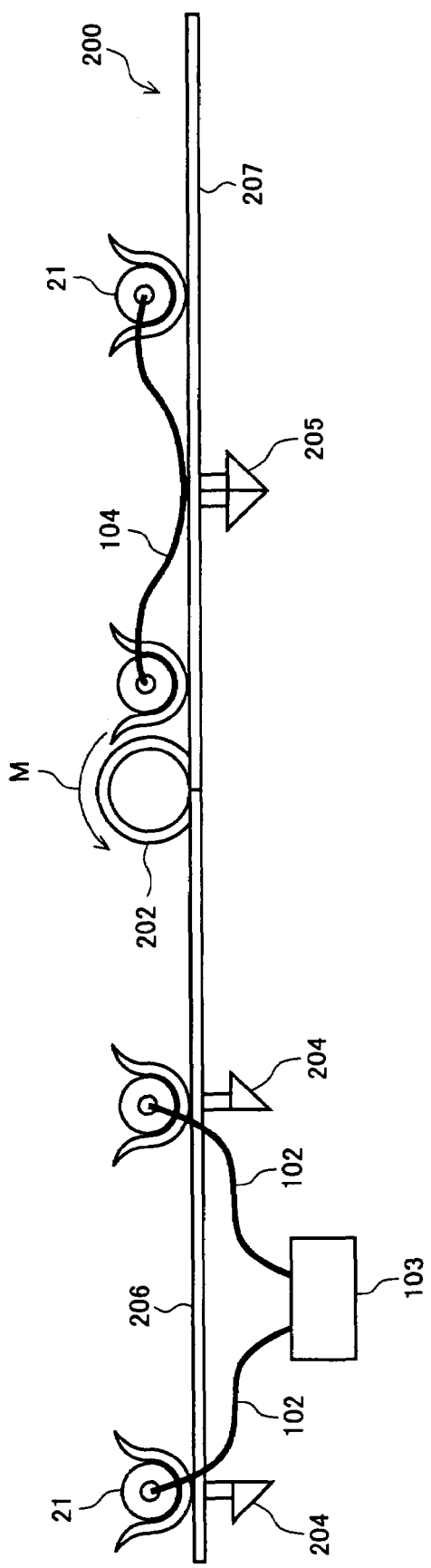
FIG. 13 is an explanatory diagram of the exemplary configuration of the lamp retaining member according to the present invention.
Figure 14:
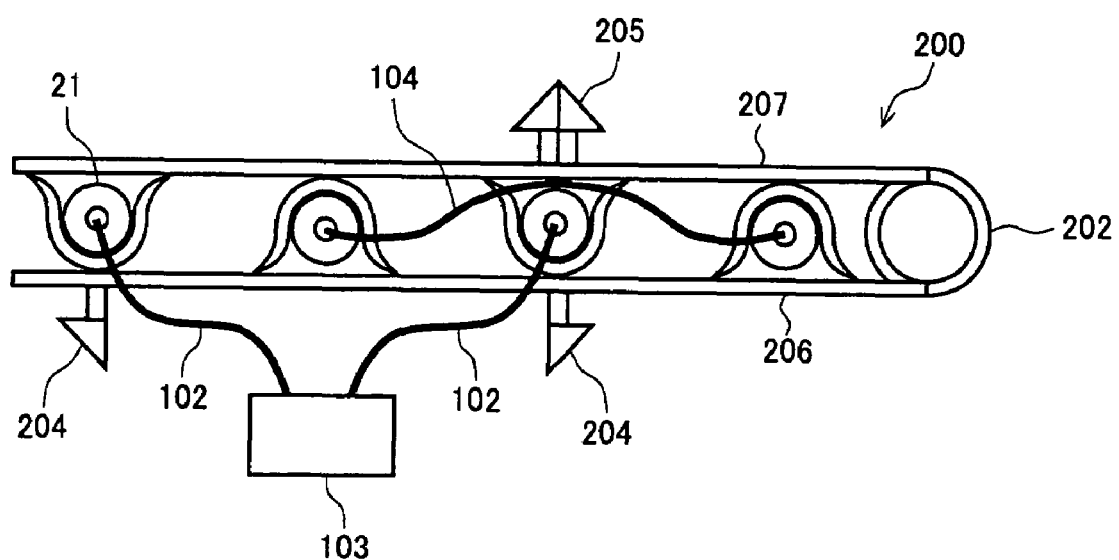
FIG. 14 depicts a state of fluorescent lamps mounted on the lamp retaining member, in which state the fluorescent lamps are set in a form for distribution.

FIGS. 12 to 14 are explanatory diagrams of exemplary configurations of a lamp retaining member according to the present invention. In FIGS. 12 to 14, 200 denotes the lamp retaining member, 201 denotes a lamp retaining portion, 202 denotes a hinge (folding portion), 203 denotes a slot, 204 and 205 denote protruding portions (mounting portions), and 206 and 207 denote basic substances.

The basic substances 206 and 207 make a pair across the hinge 202. The paired basic substances 206 and 207 are brought into an unfolded state (FIGS. 12 and 13) and into a folded state (FIG. 14) through the rotation working of the hinge 202. Preferably, the basic substances 206 and 207 have a thin platelike shape so as not to add an extra thickness in the backlight.

According to the present embodiment, the lamp retaining member 200 is used to retain a pair of pseudo-U-shaped tubes 100. The lamp retaining member 200 is provided with the lamp retaining portions 201 each retaining each fluorescent lamp 21. The hinge 202 enables folding of the lamp retaining member 200.

As shown in FIG. 12, an end of each of the fluorescent lamps 21 composed as the pseudo-U-shaped tube 100 is fitted on the lamp retaining portion 201 disposed on the paired basic substances 206 and 207 to allow the lamp retaining portion 201 to retain each fluorescent lamp 21. Though not being shown, the lamp retaining member 200 is provided also at the opposite end side of the fluorescent lamp 21, where the opposite end of the fluorescent lamp 21 is retained on the lamp retaining member 200.

The lamp retaining portion 201 has an opening, which allows the fluorescent lamp to be fitted on and removed from every lamp retaining portion 201 disposed on the basic substances 206 and 207 in the same direction when the paired basic substances 206 and 207 are in the unfolded state (FIGS. 12 and 13). As shown in FIG. 14, the openings are so arranged as to face one of the basic substances opposite to each other when the paired basic substances 206 and 207 are in the folded state (FIG. 14). When the basic substances 206 and 207 are in the folded state, therefore, the fluorescent lamps retained with the lamp retaining portions 201 do not come off, and are retained securely in a compact state.

In the present embodiment, the configuration of "a pair of basic substances" is described as a combination of separate two components, i.e., basic substances. This configuration is described as an instance, and the configuration consisting of two components is not absolute necessity. An integrally molded product may be provided as another instance to replace "a pair of basic substances". Specifically, a single oblong platelike plastic member is molded, and a folding portion making the plastic member foldable is formed near the center of the long side of the oblong body of the member by forming incisions at, for example, two or more spots. Then, each side portion separated across the foldable portion is defined as each basic substance, on which molded lamp retaining portions are disposed.

To provide the configurations shown in FIGS. 9A to 11B, a pair of pseudo-U-shaped tubes 100 is so arranged that the drive side, where the socket 103 is connected, and the middle side, where separate electrodes are connected via the lead wire 104, are set adjacent to each other. In other words, the pair of pseudo-U-shaped tubes 100 is retained on the lamp retaining member 200 in such a state that one pseudo-U-shaped tube 100 is set in reverse to the other pseudo-U-shaped tube 100.

The pair of pseudo-U-shaped tubes 100 kept mounted on the lamp retaining member 200 is housed in the enclosure 23 of the backlight. The pitch of arrangement of the lamp retaining portions 201 retaining the fluorescent lamps 21, therefore, is set to be an equal interval that is equivalent to the pitch of arrangement of the fluorescent lamps 21 in the backlight. A unit consisting of a pair of pseudo-U-shaped tubes 100 mounted on the lamp retaining member 200 is called a lamp unit.

The lamp retaining member 200 (lamp unit) holds the fluorescent lamps 21 mounted thereon in a state as shown in FIG. 13. In the state shown in FIG. 13, the hinge 202 rotates in an arrowed direction M to allow folding of the lamp retaining member 200. The configuration of the hinge 202 is not limited to the form as shown in FIG. 13, but any form allowing folding of the lamp retaining member 200 can be employed as a proper configuration.

The lead wire 102 of the socket 103 is lead through the slots 203 of the lamp retaining member 200 to circle around to stay at the back face side of the lamp retaining member 200. With the slots 203, the lamp retaining member 200 prevents the lead wire 102 from being caught between the lamp retaining member 200 and the enclosure 23 when the lamp retaining member 200 is housed in the enclosure 23.

The back face side of the lamp retaining member 200 is provided with a plurality of protruding portions 204 and 205 that fix the lamp retaining member 200 to the inner surface of the enclosure 23. The protruding portions 204 and 205 are inserted into given openings on the enclosure 23, where turned-up portions at the front ends of the protruding portions 204 and 205 engage with the enclosure 23 to keep the lamp retaining member 200 retained on the enclosure 23.

FIG. 14 depicts a state of fluorescent lamps mounted on the lamp retaining member, in which state the fluorescent lamps are set in a form for distribution.

When the lamp retaining member 200 holds a pair of pseudo-U-shaped tubes 100 mounted thereon (lamp unit) in the state shown in FIG. 13 as described above, the lamp retaining member 200 is folded on its hinge 202 to be brought into a state as shown in FIG. 14. The position of the hinge 202 is so set that the lamp retaining portions 201 are lined up alternately without colliding with each other when the lamp retaining member 200 is folded. Folding the lamp retaining member 200 causes both surfaces carrying the lamp retaining portions 201 to face each other, at which one lamp retaining portion 201 is located between a pair of lamp retaining portions 201, the one lamp retaining portion 201 facing the paired lamp retaining portions 201 when the lamp retaining member 200 is folded and the paired lamp retaining portions 201 are adjacent to each other when the lamp retaining member 200 is not folded.

As a result, when the lamp retaining member 200 is folded, the dimension of the lamp retaining member 200 in the direction of its height does not change so much while the dimension in the direction of arrangement of the fluorescent lamps can be reduced virtually into half.

Figure 15:
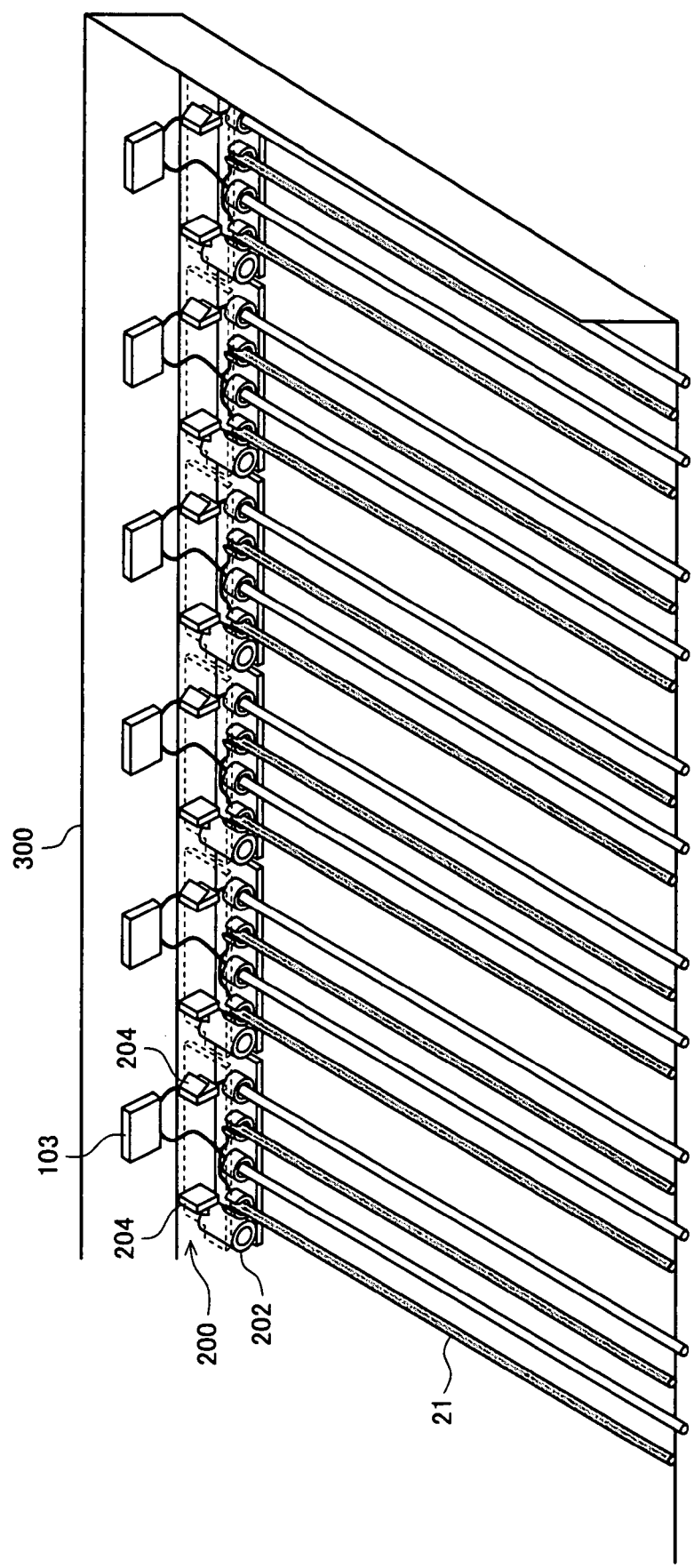
FIG. 15 is an explanatory diagram of an example of fluorescent lamps with the lamp retaining members kept folded that are housed in a packaging material.

FIG. 15 is an explanatory diagram of an example of fluorescent lamps with the lamp retaining members kept folded that are housed in a packaging material. The fluorescent lamps 21 mounted on the lamp retaining members 200 in the state shown in FIG. 14 are housed and arranged in rows in the packaging material 300 for distribution.

In this case, as described above, the lamp retaining member 200 of the present embodiment is folded to remarkably reduce the occupation area of the lamp retaining member 200. This increases the storage capacity of the packaging material 300 per unit volume. When the fluorescent lamps 21 are stored in the packaging material, therefore, the volume of the packaging material can be reduced greatly compared to a conventional case if the number of the stored fluorescent lamps 21 is the same.

FIGS. 16 to 20 are explanatory diagrams of a procedure of mounting fluorescent lamps on the enclosure of the backlight, the fluorescent lamps being provided with the lamp retaining member kept folded. Each of FIGS. 17 to 21 depicts the fixing structure of the lamp retaining member 200 at one side out of the lamp retaining members 200 disposed at both sides of the fluorescent lamps 21. The lamp retaining member 200 at the other side, however, have the same fixing structure.

First, the fluorescent lamps 21 mounted on the lamp retaining member 200 (lamp unit) are pulled off, at which the lamp retaining member 200 is in the folded state shown in FIG. 14.

Figure 16:
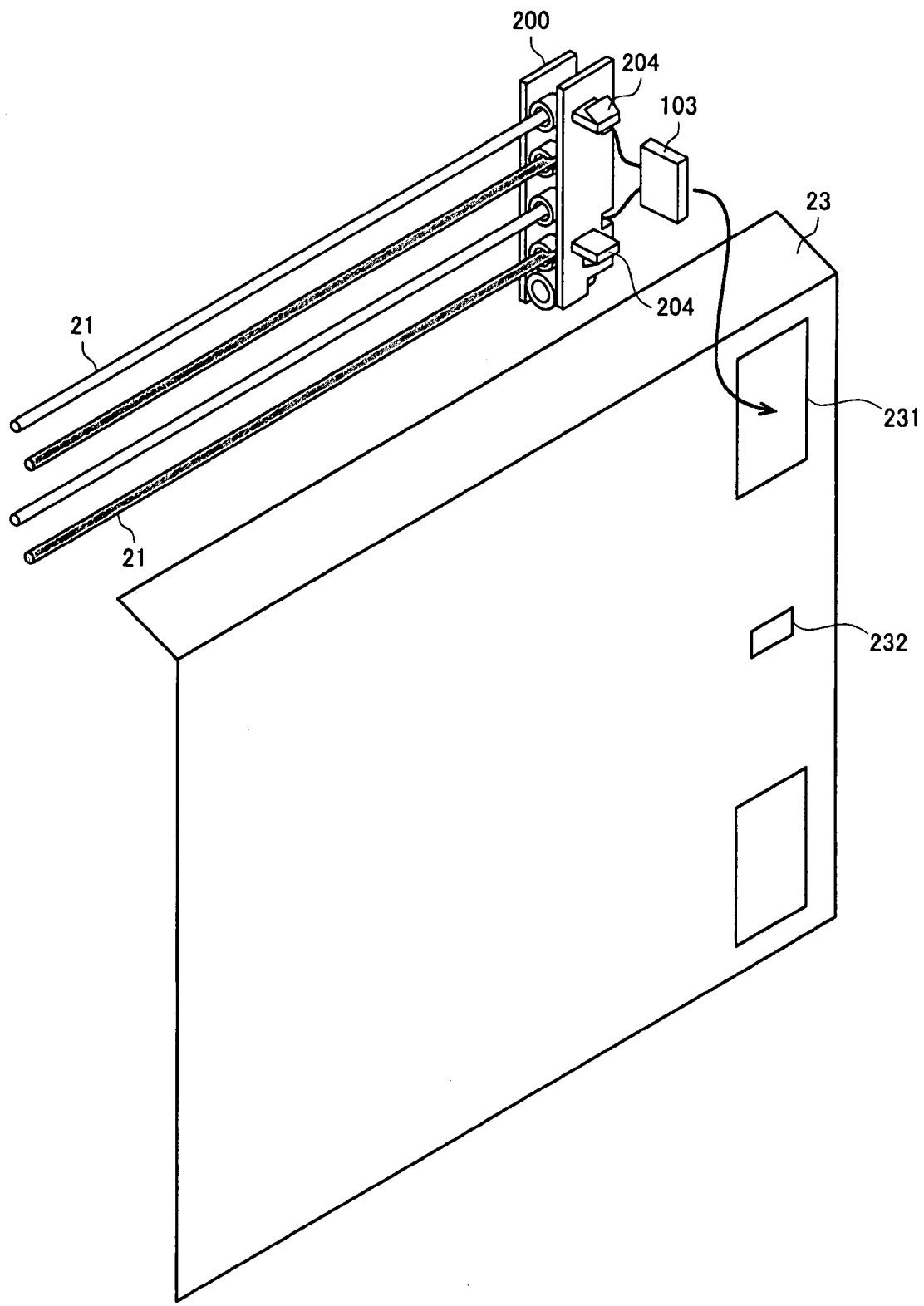
FIG. 16 is an explanatory diagram of a procedure of mounting fluorescent lamps on an enclosure of a backlight, the fluorescent lamps being provided with the lamp retaining member kept folded.
Figure 17:
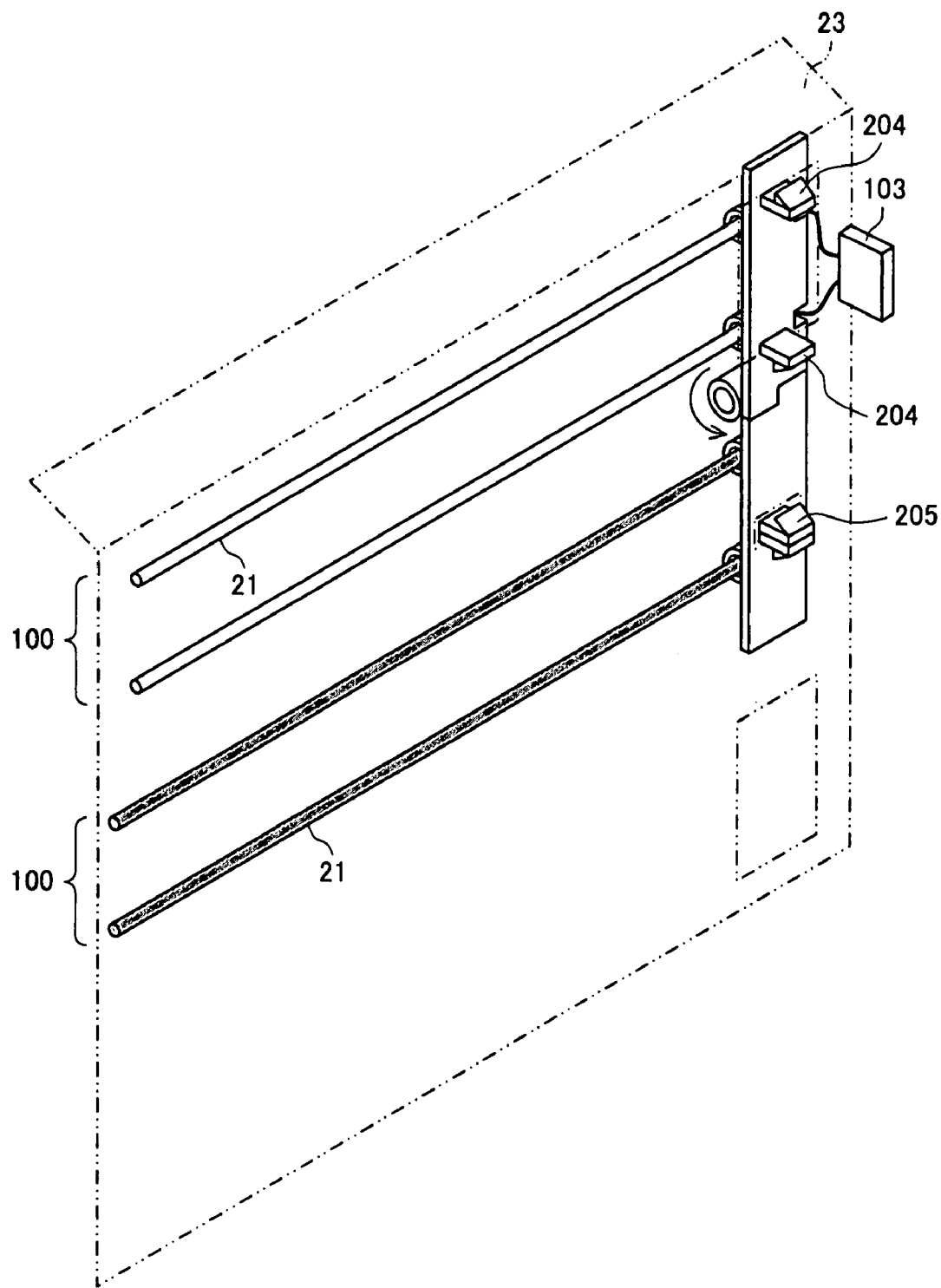
FIG. 17 is another explanatory diagram of the procedure of mounting the fluorescent lamps on the enclosure of the backlight, the fluorescent lamps being provided with the lamp retaining member kept folded.

Then, as shown in FIG. 16, the socket 103 is put through an opening 231 formed on the enclosure 23 to be pulled out of the back face side of the enclosure 23. Two protruding portions 204, which are disposed on the back face side of the lamp retaining member 200, are inserted into the opening 231 of the enclosure 23, where the protruding portions 204 are engaged with the peripheral wall of the opening 231 to fix the lamp retaining member 200 on the inner surface of the enclosure 23.

Figure 18:
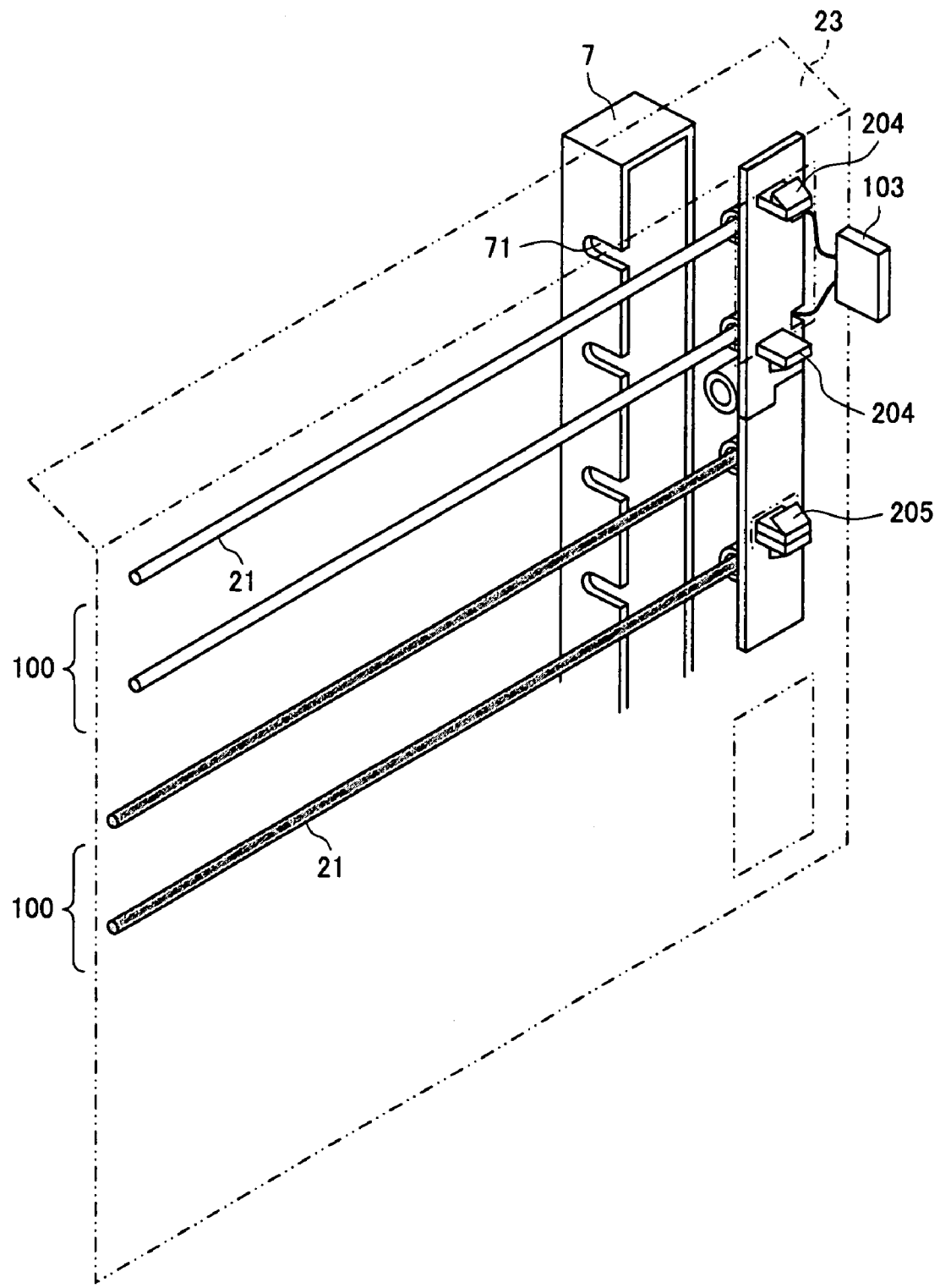
FIG. 18 is still another explanatory diagram of the procedure of mounting the fluorescent lamps on the enclosure of the backlight, the fluorescent lamps being provided with the lamp retaining member kept folded.

Subsequently, the folded lamp retaining member 200 is rotated around the hinge 202 to unfold the lamp retaining member 200 into a flat state. Then, as shown in FIG. 18, the other protruding portion 205 disposed on the lamp retaining member 200 is inserted into an opening 232 of the enclosure 23, where the protruding portion 205 is engaged with the peripheral wall of the opening 232. Hence the lamp retaining member 200 is fixed and retained at a given position in the enclosure 23 through simple work. At this time, four fluorescent lamps 21 arranged at a given pitch are disposed at a given position.

The same work as described above is repeated until the fluorescent lamps 21 in a given number are mounted on the enclosure 23. For example, when eight fluorescent lamps 21 are mounted using four pseudo-U-shaped tubes 100, two lamp units each consisting of a pair of pseudo-U-shaped tubes 100, which lamp units are mounted on the lamp retaining member 200, are used to complete mounting of the fluorescent lamps 21 in the given number.

Figure 19:
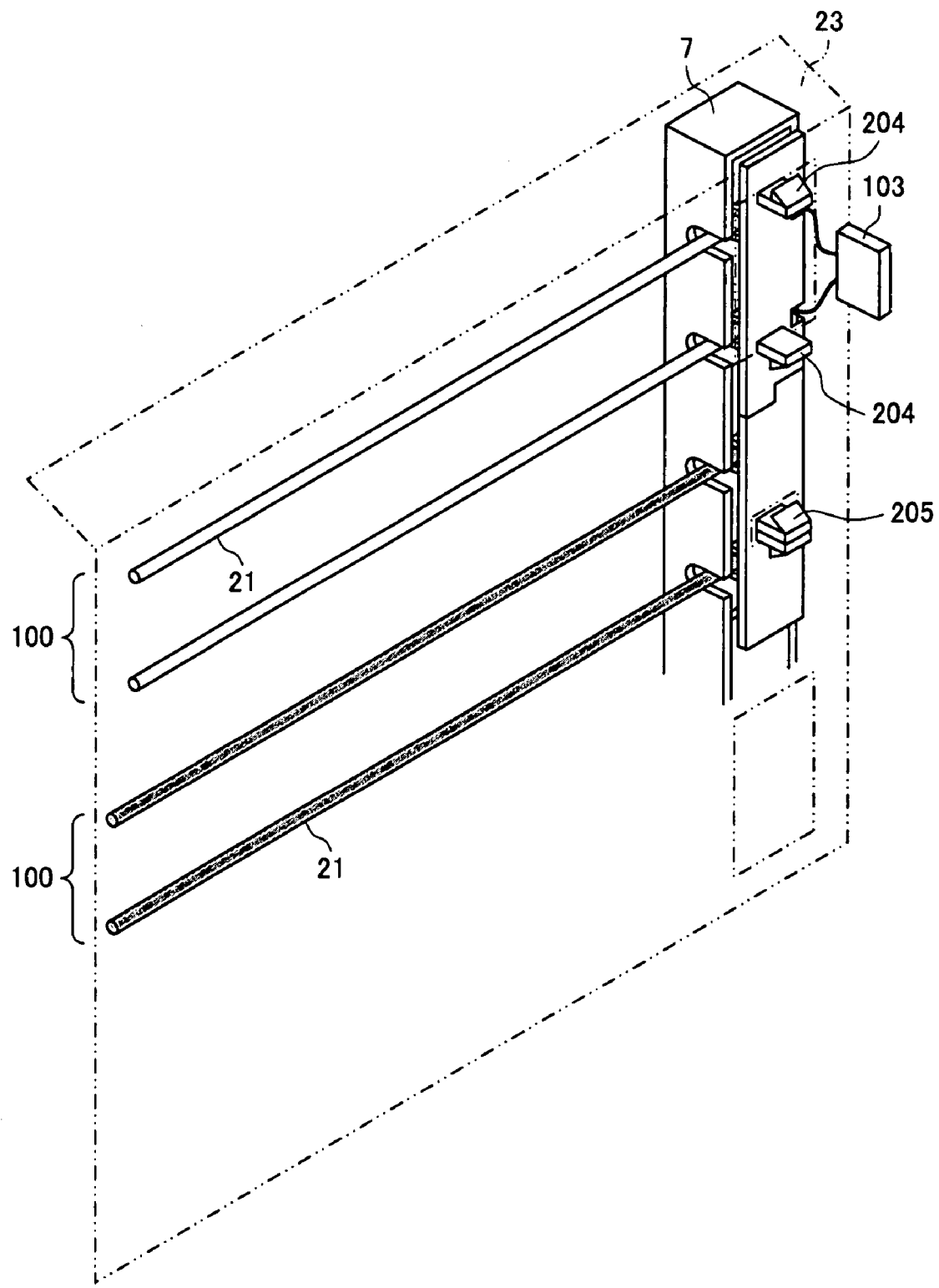
FIG. 19 is still another explanatory diagram of the procedure of mounting the fluorescent lamps on the enclosure of the backlight, the fluorescent lamps being provided with the lamp retaining member kept folded.

Then, as shown in FIGS. 18 and 19, a lamp holder 7 is fitted on the lamp retaining member 200 for protecting electrodes of the fluorescent lamps 21. The lamp holder 7 is engaged with the lamp retaining member 200 to be fixed to the lamp retaining member 200. The lamp holder 7 has cutouts 71 that are formed at a pitch corresponding to that of arrangement of the fluorescent lamps 21 so that each fluorescent lamp 21 is located in a space formed by each cutout 71 when the lamp holder 7 is fitted on the lamp retaining member 200.

Figure 20:
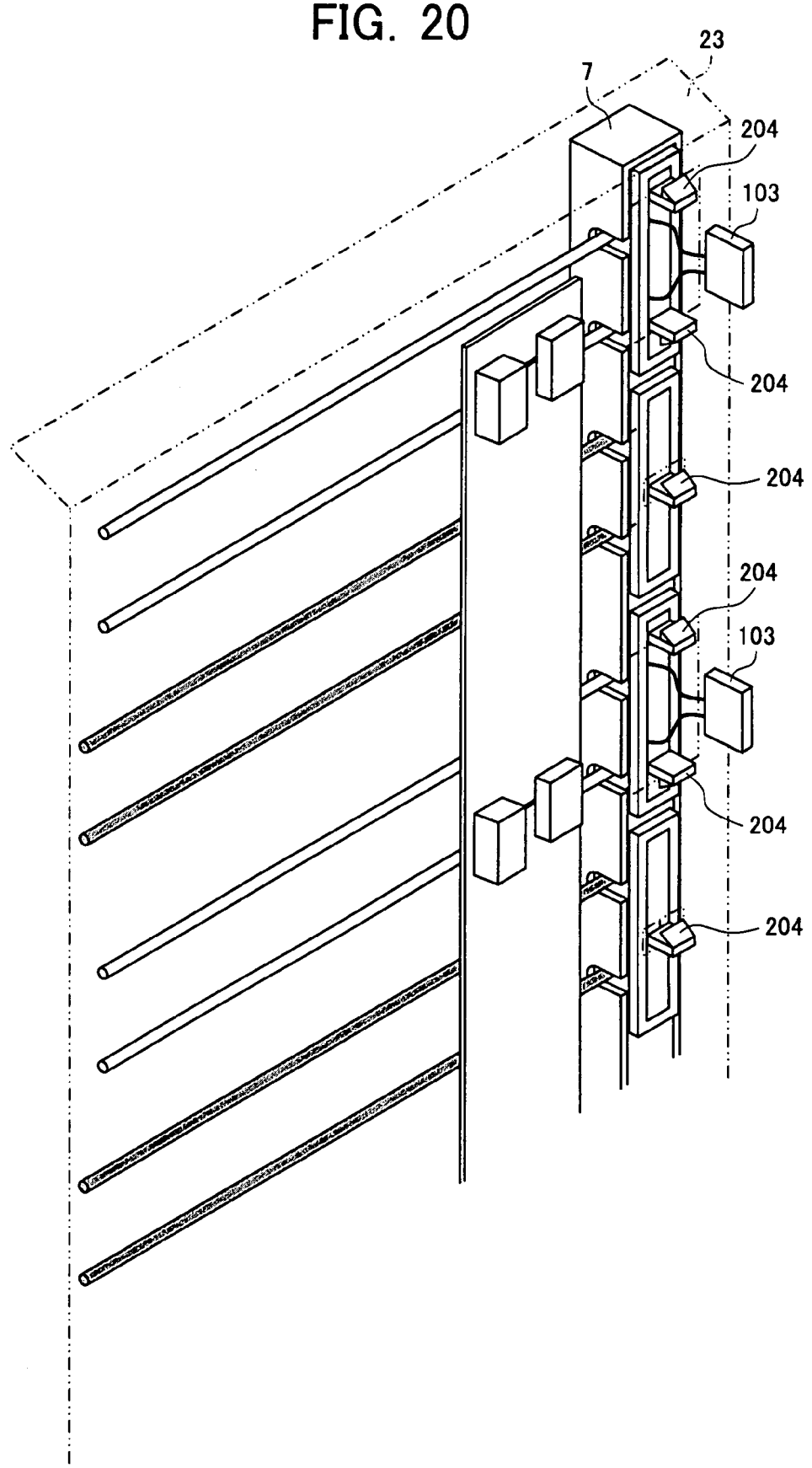
FIG. 20 is still another explanatory diagram of the procedure of mounting the fluorescent lamps on the enclosure of the backlight, the fluorescent lamps being provided with the lamp retaining member kept folded.

As shown in FIG. 20, the inverter circuit board 28 is disposed on the back face side of the enclosure 23. The inverter circuit board 28 is provided with the inverter transformers 29, and the connecting members 30 connected to the inverter transformers 29.

Since the drive side and the middle side of the pseudo-U-shaped tubes 100 are arranged alternately, the inverter transformer 29 for driving the pseudo-U-shaped tube 100 is arranged for every other pseudo-U-shaped tube 100. Each socket 103 of the pseudo-U-shaped tube 100 is connected to each corresponding connecting member 30. A driving method by the inverter transformer 29 is set in advance according to each of the configurations shown in FIGS. 9A to 11B.

According to the present embodiment, a pair of pseudo-U-shaped tubes 100 are mounted on the lamp retaining member 200 to compose a lamp unit. A lamp unit, however, may be composed of a plurality of pseudo-U-shaped tubes 100. For example, four pseudo-U-shaped tubes 100 may be retained on the lamp retaining member to compose a lamp unit.

The present invention enables the reduction or elimination of the irregularities of luminance of a backlight due to a luminance difference arising in the direction of the tube axis of fluorescent lamps without involving unnecessary trouble in fluorescent lamp arrangement work when a production worker, etc., carries out fluorescent lamp mounting work.

According to the present invention, alternately arranged fluorescent lamps are kept folded in a unit form to widely reduce a space occupied by the fluorescent lamps in packaging the fluorescent lamps, eliminate a need of work of checking or reversing the direction of the fluorescent lamps upon mounting the fluorescent lamps, and enable the production of a backlight device free from luminance irregularities in streamlined and highly reliable workability.

According to the present invention, particularly, a plurality of (e.g., a pair of) alternately arranged pseudo-U-shaped tubes compose one lamp unit, which eliminates a need for a worker to pay attention to the direction of arrangement of lamps when the worker mounts a lamp unit. This enables the reduction or elimination of phenomena of irregularity of luminance of backlight due to a luminance difference between both electrodes that tends to arise in a fluorescent lamp without involving unnecessary trouble in arrangement work.

A lamp retaining member according to the present invention is foldable, which offers improved storage efficiency in packaging each lamp unit. As a result, the number of lamps stored in a packaging material, etc., becomes far greater than in a conventional case, which allows a reduction in a time for transportation/transfer work and in a material space, etc.

The invention claimed is:

1. A lamp retaining member retaining a plurality of lamp units each comprising a plurality of lamps having electrodes at both ends thereof, a bundling member bundling a wire from each of the electrodes at one end of the plurality of lamps, and a conductive member connecting electrodes at the other end of the plurality of lamps through a conductive path, wherein
the lamp retaining member retains the vicinity of a central of each of the lamps so arranged in parallel that the bundling members are set in the same direction, and allows the one retained lamp unit to rotate relative to the other retained lamp unit adjacent thereto, and wherein
the lamp retaining member retains the lamp units adjacent to each other so that the bundling members and the conductive members are arranged alternately after the one lamp unit has been rotated.

2. A backlight device comprising:
the lamp retaining member as defined in claim 1;
a plurality of the lamp units retained by the lamp retaining member; and
a pair of inverter circuit boards turning on the plurality of lamp units, wherein
the lamp units adjacent to each other are so arranged that the bundling members and the conductive members are set in alternate positions.

3. The backlight device as defined in claim 2, comprising a connecting member connected detachably to the bundling member, the connecting member supplying high ac voltage from a transformer on the inverter circuit board to at least one of electrodes of the plurality of lamps, the electrodes being connected to the bundling member, wherein
each of the inverter circuit board is mounted with the connecting member corresponding to the bundling member.

4. The backlight device as defined in claim 2, wherein
the lamp unit is driven for one-side operation by a transformer on the inverter circuit board.

5. The backlight device as defined in claim 2, wherein
the lamp unit is driven for double-side operation by a transformer on the inverter circuit board.

6. The backlight device as defined in claim 2, wherein
each of the inverter circuit board is disposed on a face opposite to a face setting the lamp unit arranged thereon, and is located to be close to electrodes at both ends of the lamp unit.

7. A liquid crystal display apparatus comprising the backlight device as defined in claim 2, and a liquid crystal panel illuminated with the backlight device.

8. A lamp retaining member retaining a plurality of lamp units each comprising:
a plurality of lamps having electrodes at both ends thereof,
a bundling member bundling a wire from each of the electrodes at one end of the plurality of lamps, and
a conductive member connecting electrodes at the other end of the plurality of lamps through a conductive path, wherein the lamp retaining member retains the vicinity of a central of each of the lamps so arranged in parallel that the bundling members are set in the same direction, and allows the one retained lamp unit to rotate relative to the other retained lamp unit adjacent thereto;
a first retaining member retaining the one lamp unit;
a second retaining member retaining the other lamp unit;
a rotating shaft erected on the first retaining member; and
a protruding portion that houses the rotating shaft so as to allow the rotating shaft to rotate and that is formed integrally with the second retaining member, wherein
when the one lamp unit is not rotated, a bottom of the first retaining member is so fitted to a bottom of the second retaining member that both bottoms do not overlap each other, and the first retaining member is coupled to the second retaining member via the rotating shaft, and wherein when the one lamp unit is rotated, the first retaining member is separated away from the second retaining member to render the rotating shaft rotatable state relative to the protruding portion, so that the first retaining member can be rotated 180 degrees around the rotating shaft.

9. A lamp retaining member retaining a plurality of lamp units each comprising:
a plurality of lamps having electrodes at both ends thereof,
a bundling member bundling a wire from each of the electrodes at one end of the plurality of lamps, and
a conductive member connecting electrodes at the other end of the plurality of lamps through a conductive path, wherein the lamp retaining member retains the vicinity of a central of each of the lamps so arranged in parallel that the bundling members are set in the same direction, and allows the one retained lamp unit to rotate relative to the other retained lamp unit adjacent thereto
a first retaining member retaining the one lamp unit;
a second retaining member retaining the other lamp unit;
a rotating shaft extended from the first retaining member toward the second retaining member, and
a passage that houses the rotating shaft so as to allow the rotating shaft to slide and rotate and that is formed longitudinally inside the second retaining member, wherein when the one lamp unit is not rotated, the first retaining member is coupled to the second retaining member via the rotating shaft, and wherein when the one lamp unit is rotated, the first retaining member is bent on a front end of the rotating shaft at approximate right angles against the second retaining member, and the first retaining member is rotated 180 degrees around the rotating shaft, and then the rotating shaft is allowed to slide in the passage.

10. A lamp retaining method for retaining a plurality of lamp units each comprising a plurality of lamps having electrodes at both ends thereof, a bundling member bundling a wire from each of electrodes at one end of the plurality of lamps, and a conductive member connecting electrodes at the other end of the plurality of lamps through a conductive path, wherein
the method is carried out to retain the vicinity of a central of each of lamps so arranged in parallel that the bundling members are set in the same direction, and to cause the one retained lamp unit to rotate relative to the other lamp unit adjacent thereto, and wherein
the method is carried out to retain lamp units adjacent to each other so that the bundling member and the conductive member are arranged alternately after the one lamp unit has been rotated.

\* \* \* \* \*